United States Patent
Muller

(10) Patent No.: US 10,692,618 B2
(45) Date of Patent: Jun. 23, 2020

(54) HAZARDOUS MATERIAL CANISTER

(71) Applicant: Deep Isolation, Inc., Berkeley, CA (US)

(72) Inventor: Richard A. Muller, Berkeley, CA (US)

(73) Assignee: Deep Isolation, Inc., Berkeley, CA (US)

( * ) Notice: Subject to any disclaimer, the term of this patent is extended or adjusted under 35 U.S.C. 154(b) by 0 days.

(21) Appl. No.: 16/430,117

(22) Filed: Jun. 3, 2019

(65) Prior Publication Data

US 2020/0027607 A1   Jan. 23, 2020

Related U.S. Application Data

(60) Provisional application No. 62/680,113, filed on Jun. 4, 2018.

(51) Int. Cl.
| | | |
|---|---|---|
| G21C 19/00 | (2006.01) | |
| G21F 5/008 | (2006.01) | |
| G21F 1/08 | (2006.01) | |
| G21F 5/002 | (2006.01) | |
| G21F 9/36 | (2006.01) | |
| E21B 41/00 | (2006.01) | |

(52) U.S. Cl.
CPC ............... *G21F 5/008* (2013.01); *G21F 1/08* (2013.01); *G21F 5/002* (2013.01); *G21F 9/36* (2013.01); *E21B 41/0057* (2013.01)

(58) Field of Classification Search
CPC . G21F 5/00; G21F 5/005; G21F 5/008; G21F 5/012; G21F 5/02; G21F 5/06; G21F 5/12; G21F 5/14
See application file for complete search history.

(56) References Cited

U.S. PATENT DOCUMENTS

| | | | |
|---|---|---|---|
| 3,711,715 | A | 1/1973 | Bochard |
| 3,780,309 | A | 12/1973 | Bochard |
| 3,902,548 | A | 9/1975 | Bochard |
| 3,930,166 | A | 12/1975 | Bochard |
| 3,948,575 | A | 4/1976 | Rosser |
| 4,274,007 | A | 6/1981 | Baatz et al. |
| 4,320,028 | A | 3/1982 | Leuchtag |
| 4,337,167 | A | 6/1982 | Bird et al. |
| 5,165,235 | A | 11/1992 | Nitschke |
| 5,199,488 | A | 4/1993 | Kasevich et al. |

(Continued)

FOREIGN PATENT DOCUMENTS

| | | |
|---|---|---|
| EP | 2555203 | 2/2013 |
| JP | H09264992 | 10/1997 |

(Continued)

OTHER PUBLICATIONS

[No Author] World Nuclear News, "Yucca Mountain cost estimate rises to $96 billion", Aug. 6, 2008, 2 pages, ISSN 2040-5766.

(Continued)

*Primary Examiner* — Marshall P O'Connor
(74) *Attorney, Agent, or Firm* — Fish & Richardson P.C.

(57) ABSTRACT

A canister to store spent nuclear fuel in an underground repository includes a first end portion; a second end portion; and a middle portion attachable to the first and second end portions to define an interior volume of the housing that is sized to enclose at least one spent nuclear fuel assembly. The first and second end portions comprise shielding.

31 Claims, 14 Drawing Sheets

(56) References Cited

U.S. PATENT DOCUMENTS

| | | | |
|---|---|---|---|
| 5,314,264 A | 5/1994 | Danko et al. | |
| 5,340,235 A | 8/1994 | Milliken | |
| 5,377,104 A | 12/1994 | Sorrells et al. | |
| 5,387,741 A | 2/1995 | Shuttle | |
| 5,786,611 A | 7/1998 | Quapp et al. | |
| 5,835,548 A | 10/1998 | Lindgren et al. | |
| 5,832,392 A | 11/1998 | Forsberg | |
| 5,850,614 A | 12/1998 | Crichlow | |
| 5,863,283 A | 1/1999 | Gardes | |
| 6,114,710 A | 9/2000 | Contrepois et al. | |
| 6,238,138 B1 | 5/2001 | Crichlow | |
| 6,366,633 B1* | 4/2002 | Stezaly | G21F 5/12 376/202 |
| 6,372,157 B1 | 4/2002 | Krill et al. | |
| 6,784,443 B2 | 8/2004 | Pennington et al. | |
| 6,853,697 B2 | 2/2005 | Singh et al. | |
| 6,889,108 B2 | 5/2005 | Tanaka et al. | |
| 6,925,138 B2 | 8/2005 | Nakamaru et al. | |
| 7,068,748 B2 | 6/2006 | Singh | |
| 7,287,934 B2 | 10/2007 | Okutsu et al. | |
| 7,330,526 B2 | 2/2008 | Singh | |
| 7,590,213 B1 | 9/2009 | Singh | |
| 7,781,637 B2 | 8/2010 | Russell et al. | |
| 7,786,456 B2 | 8/2010 | Singh et al. | |
| 7,933,374 B2 | 4/2011 | Singh | |
| 8,003,966 B2 | 8/2011 | Temus et al. | |
| 8,098,790 B2 | 1/2012 | Singh | |
| 8,135,107 B2 | 3/2012 | Singh et al. | |
| 8,342,357 B1 | 1/2013 | Grubb et al. | |
| 8,351,562 B2 | 1/2013 | Singh | |
| 8,437,444 B2 | 5/2013 | Pennington et al. | |
| 8,561,318 B2 | 10/2013 | Singh et al. | |
| 8,576,976 B2 | 11/2013 | Singh et al. | |
| 8,625,732 B2 | 1/2014 | Singh | |
| 8,630,384 B2 | 1/2014 | Carver et al. | |
| 8,657,549 B2 | 2/2014 | Grubb et al. | |
| 8,737,559 B2 | 5/2014 | Singh | |
| 8,798,224 B2 | 8/2014 | Singh | |
| 8,929,504 B2 | 1/2015 | Singh et al. | |
| 8,933,289 B2 | 1/2015 | Crichlow | |
| 9,349,493 B2 | 5/2016 | Bracey et al. | |
| 9,396,824 B2 | 7/2016 | Agace | |
| 9,442,037 B2 | 9/2016 | Agace | |
| 9,443,625 B2 | 9/2016 | Singh | |
| 9,514,853 B2 | 12/2016 | Singh et al. | |
| 9,558,857 B2 | 1/2017 | Subiry | |
| 9,640,289 B2 | 5/2017 | Springman et al. | |
| 9,672,948 B2 | 6/2017 | Singh | |
| 9,724,790 B2 | 8/2017 | Grubb et al. | |
| 9,748,009 B2 | 8/2017 | Singh | |
| 9,761,338 B2 | 9/2017 | Singh | |
| 9,779,843 B2 | 10/2017 | Singh et al. | |
| 9,831,005 B2 | 11/2017 | Singh | |
| 9,833,819 B2 | 12/2017 | Burget | |
| 9,852,822 B2* | 12/2017 | Singh | G21F 5/14 |
| 9,916,911 B2 | 3/2018 | Singh | |
| 10,002,683 B2 | 6/2018 | Muller et al. | |
| 10,008,299 B2 | 6/2018 | Wellwood et al. | |
| 10,020,084 B2 | 7/2018 | Lehnert et al. | |
| 10,032,533 B2 | 7/2018 | Carver et al. | |
| 10,037,826 B2 | 7/2018 | Singh et al. | |
| 10,049,777 B2 | 8/2018 | Singh | |
| 10,115,490 B1 | 10/2018 | Downey | |
| 10,147,509 B2 | 12/2018 | Singh | |
| 10,217,537 B2 | 2/2019 | Agace | |
| 10,229,764 B2 | 3/2019 | Singh et al. | |
| 10,265,743 B1 | 4/2019 | Muller et al. | |
| 10,297,356 B2 | 5/2019 | Springman et al. | |
| 10,311,987 B2 | 6/2019 | Singh et al. | |
| 10,332,642 B2 | 6/2019 | Singh | |
| 10,373,722 B2 | 8/2019 | Singh | |
| 10,410,756 B2 | 9/2019 | Singh | |
| 10,438,710 B2 | 10/2019 | Subiry | |
| 10,446,287 B2 | 10/2019 | Singh | |
| 2001/0032851 A1 | 10/2001 | Pennington et al. | |
| 2002/0020528 A1 | 2/2002 | McCabe et al. | |
| 2004/0109523 A1 | 6/2004 | Singh et al. | |
| 2005/0117687 A1 | 6/2005 | Carver et al. | |
| 2005/0207525 A1 | 9/2005 | Singh | |
| 2005/0220257 A1 | 10/2005 | Singh | |
| 2006/0215803 A1 | 9/2006 | Singh | |
| 2008/0069291 A1 | 3/2008 | Singh et al. | |
| 2008/0073601 A1 | 3/2008 | Temus et al. | |
| 2009/0158614 A1 | 6/2009 | Singh et al. | |
| 2009/0159550 A1 | 6/2009 | Singh et al. | |
| 2009/0252274 A1 | 10/2009 | Singh | |
| 2010/0105975 A1 | 4/2010 | Baird | |
| 2010/0254785 A1 | 10/2010 | Grubb et al. | |
| 2010/0272225 A1 | 10/2010 | Singh | |
| 2010/0284506 A1 | 11/2010 | Singh | |
| 2011/0005762 A1 | 1/2011 | Poole | |
| 2011/0021859 A1 | 1/2011 | Singh | |
| 2011/0255647 A1 | 10/2011 | Singh | |
| 2012/0083644 A1 | 4/2012 | Singh | |
| 2013/0070885 A1 | 3/2013 | Singh et al. | |
| 2013/0112408 A1 | 5/2013 | Oxtoby | |
| 2013/0163710 A1 | 6/2013 | Singh | |
| 2013/0322589 A1 | 12/2013 | Bracey et al. | |
| 2013/0340225 A1 | 12/2013 | Grubb et al. | |
| 2014/0039235 A1 | 2/2014 | Subiry | |
| 2014/0047733 A1 | 2/2014 | Singh et al. | |
| 2014/0177776 A1 | 6/2014 | Singh | |
| 2014/0192946 A1 | 7/2014 | Singh | |
| 2014/0219408 A1 | 8/2014 | Singh | |
| 2014/0270043 A1* | 9/2014 | Lehnert | G21F 5/008 376/272 |
| 2014/0317952 A1 | 10/2014 | Singh | |
| 2014/0329455 A1 | 11/2014 | Singh | |
| 2014/0341330 A1 | 11/2014 | Singh | |
| 2015/0069274 A1 | 3/2015 | Agace | |
| 2015/0071398 A1 | 3/2015 | Singh | |
| 2015/0092904 A1 | 4/2015 | Carver et al. | |
| 2015/0211954 A1 | 7/2015 | Agace | |
| 2015/0340112 A1 | 11/2015 | Singh et al. | |
| 2015/0357066 A1 | 12/2015 | Singh | |
| 2016/0027538 A1 | 1/2016 | Singh et al. | |
| 2016/0118152 A1 | 4/2016 | Singh et al. | |
| 2016/0163404 A9 | 6/2016 | Singh | |
| 2016/0196887 A1 | 7/2016 | Singh et al. | |
| 2016/0203884 A1 | 7/2016 | Springman et al. | |
| 2016/0365163 A1 | 12/2016 | Singh | |
| 2017/0110209 A1 | 4/2017 | Subiry | |
| 2017/0110210 A1 | 4/2017 | Singh | |
| 2017/0236605 A1 | 8/2017 | Springman et al. | |
| 2017/0301425 A1 | 10/2017 | Wellwood et al. | |
| 2018/0005717 A1 | 1/2018 | Singh et al. | |
| 2018/0005718 A1 | 1/2018 | Singh | |
| 2018/0025800 A1 | 1/2018 | Singh | |
| 2018/0053574 A1 | 2/2018 | Singh | |
| 2018/0061515 A1 | 3/2018 | Singh | |
| 2018/0144841 A1 | 5/2018 | Singh | |
| 2018/0190401 A1 | 7/2018 | Singh | |
| 2018/0277273 A1 | 9/2018 | Singh et al. | |
| 2018/0290188 A1 | 10/2018 | Crichlow | |
| 2018/0301231 A1 | 10/2018 | Singh et al. | |
| 2018/0308594 A1 | 10/2018 | Carver et al. | |
| 2018/0322970 A1 | 11/2018 | Singh et al. | |
| 2018/0345336 A1* | 12/2018 | Muller | B09B 1/006 |
| 2019/0066858 A1 | 2/2019 | Sisley et al. | |
| 2019/0099790 A1 | 4/2019 | Muller et al. | |
| 2019/0103197 A1 | 4/2019 | Singh et al. | |
| 2019/0139661 A1 | 5/2019 | Singh | |
| 2019/0326028 A1 | 10/2019 | Singh | |
| 2019/0348186 A1 | 11/2019 | Singh | |

FOREIGN PATENT DOCUMENTS

| | | |
|---|---|---|
| JP | 2004011708 | 1/2004 |
| WO | WO92007667 | 5/1992 |

(56) References Cited

FOREIGN PATENT DOCUMENTS

| WO | WO2015069300 | 5/2015 |
|---|---|---|
| WO | WO 2016177876 | 11/2016 |

OTHER PUBLICATIONS

Bill W. Arnold, et al., "Reference Design and Operations of Deep Borehole Disposal of High-Level Radioactive Waste," Sandia National Laboratories (2011) ("Sandia Report") (available at: http://prod.sandia.gov/techlibiaccess-control.cgi/2011/116749.pdf), 67 pages.
Christopher Ian Hoag, "Canister Design for Deep Borehole Disposal of Nuclear Waste," Massachusetts Institute of Technology, May 2006 (pp. 1-6).
Cornwall, W., "Deep Sleep. Boreholes drilled into Earth's crust get a fresh look for nuclear waste disposal," Science, vol. 349, Issue 6244, Jul. 10, 2015, 132-35.
Faybishenko et al., Editors, Lawrence Berkeley National Laboratory and Sandia National Laboratories: "International Approaches for Deep Geological Disposal of Nuclear Waste: Geological Challenges in Radioactive Waste Isolation", prepared for the US Department of Energy, Fifth Worldwide Review—2016, 474 pages.
Frances Elizabeth Dozier, "Feasibility of Very Deep Borehole Disposal of US Nuclear Defense Wastes," Massachusetts Institute of Technology, Sep. 2011 (pp. 1-12).
Gibb et al., "A Model for Heat Flow in Deep Borehole Disposals of High-Level Nuclear Waste," Journal of Geophysical Research, vol. 113, dated May 6, 2008, 18 pages.
Hiroki Sone and Mark D. Zoback, "Mechanical properties of shale-gas reservoir rocks—Part 1:Static and dynamic elastic properties and anisotropy," Geophysics, vol. 78, No. 5, Sep. Oct. 2013, D381-92.
International Search Report and Written Opinion issued in International Application No. PCT/US2016/066539, dated Apr. 19, 2017, 13 pages.
J. Winterle et al., Regulatory Perspectives on Deep Borehole Disposal Concepts, prepared for the U.S. Nuclear Regulatory Commission, Contract NRC-02-07006, Center for Nuclear Waste Regulatory Analyses, San Antonio, TX, May 2011, 24 pages.
Johnathan Sutton Gibbs, "Feasibility of Lateral Emplacement in Very Deep Borehole Disposal of High Level Nuclear Waste" master's thesis, Massachusetts Institute of Technology (2010) ("Gibbs") (available at: https://dspace.mit.edu/handle/1721.1/63242), 2 pages.
Neuzil et al., "Shale: An overlooked option forUS nuclear waste disposal," Bulletin of the Atomic Scientists Nov. 2014, Retrieved from the Internet: http://thebulletin .org/shale-overlooked-option-us-nuclear-waste-disposal7831 printed Sep. 26, 2016, 5 pages.
Neuzil, "Can Shale Safely Host U.S. Nuclear Waste?" EOS. vol. 94, No. 30, Dated Jul. 23, 2013, 3 pages.
PCT Notification of Transmittal of the International Search Report and Written Opinion in International Application No. PCT/US2018/035974, dated Aug. 24, 2018, 13 pages.
U.S. Nuclear Waste Technical Review Board, A Report to the U.S. Congress and the Secretary of Energy, Evaluation of Technical Issues Associated With the Development of a Separate Repository for U.S. Department of Energy-Managed High-Level Radioactive Waste and Spent Nuclear Fuel (2015) ("NWTRB") (available at: http://www.nwtrb.gov/reports/disposal_options.pdf), 30 pages.
Vartabedian, Ralph; "Decades-old war over Yucca Mountain nuclear dump resumes under Trump budget plan", Mar. 29, 2017, ralph.vartabdian©latimes.com; twitter ©rvartabedian; 4 pages.
YuccaMountain.org; Eureka County, Nevada—Nuclear Waste Office, FAQ, Eureka County Home, last updated Mar. 17, 2017; 12 pages.
PCT Invitation to Pay Additional Fees in International Appln. No. PCT/US2019/035324, dated Sep. 12, 2019, 15 pages.
PCT International Search Report and Written Opinion in International Appln. No. PCT/US2019/035324, dated Dec. 2, 2019, 19 pages.

\* cited by examiner

HAZARDOUS MATERIAL CANISTER

CROSS-REFERENCE TO RELATED APPLICATION

This application claims priority under 35 U.S.C. § 119 to U.S. Provisional Patent Application Ser. No. 62/680,113, filed on Jun. 4, 2018, the entire contents of which are incorporated by reference herein.

TECHNICAL FIELD

This disclosure relates to a hazardous material canister and, more particularly, a canister for spent nuclear fuel.

BACKGROUND

Hazardous waste is often placed in long-term, permanent, or semi-permanent storage so as to prevent health issues among a population living near the stored waste. Such hazardous waste storage is often challenging, for example, in terms of storage location identification and surety of containment. For instance, the safe storage of nuclear waste (e.g., spent nuclear fuel, whether from commercial power reactors, test reactors, or even high-grade military waste) is considered to be one of the outstanding challenges of energy technology. Safe storage of the long-lived radioactive waste is a major impediment to the adoption of nuclear power in the United States and around the world.

SUMMARY

In a general implementation, a canister to store spent nuclear fuel in an underground repository includes a first end portion; a second end portion; and a middle portion attachable to the first and second end portions to define an interior volume of the housing that is sized to enclose at least one spent nuclear fuel assembly. The first and second end portions comprise shielding.

In an aspect combinable with the general implementation, the middle portion comprises a material configured to allow transmission of gamma rays therethrough.

In another aspect combinable with any one of the previous aspects, the material comprises a barrier to radioactive liquid, solid, and gas transmission therethrough.

In another aspect combinable with any one of the previous aspects, the radioactive gas comprises tritium gas.

In another aspect combinable with any one of the previous aspects, the middle portion comprises a circular cross-section.

In another aspect combinable with any one of the previous aspects, the second portion comprises a bottom member of the canister.

In another aspect combinable with any one of the previous aspects, the bottom member is mechanically attached to the middle portion.

In another aspect combinable with any one of the previous aspects, the mechanical attachment comprises a weld.

In another aspect combinable with any one of the previous aspects, the shielding comprises a barrier to gamma ray transmission therethrough, and the shielding comprises a barrier to radioactive liquid and gas transmission therethrough.

In another aspect combinable with any one of the previous aspects, the interior volume comprises a height dimension of between about 12 feet and about 15 feet and a cross-sectional diameter of between 7 inches and 13 inches.

In another aspect combinable with any one of the previous aspects, the interior volume is sized to enclose a single spent nuclear fuel assembly.

In another aspect combinable with any one of the previous aspects, the interior volume comprises a height dimension that between about 24 feet and about 30 feet and a cross-sectional diameter of diameter of between 7 inches and 13 inches.

In another aspect combinable with any one of the previous aspects, the interior volume is sized to enclose two or more spent nuclear fuel assemblies that are linearly arranged in the interior volume.

In another aspect combinable with any one of the previous aspects, the material comprises stainless or carbon steel.

In another aspect combinable with any one of the previous aspects, the material comprises titanium or a nickel-chromium alloy.

Another aspect combinable with any one of the previous aspects further includes one or more rollers or bearings mounted to the middle portion.

Another aspect combinable with any one of the previous aspects further includes an electrically non-conductive material attached to the middle portion.

In another aspect combinable with any one of the previous aspects, the non-conductive material comprises a plurality of quartz members attached to an exterior surface of the middle portion.

In another aspect combinable with any one of the previous aspects, at least a portion of the plurality of quartz members comprises spherical or partially-spherical quartz members.

Another aspect combinable with any one of the previous aspects further includes a non-conductive covering that encloses at least a portion of the non-conductive material.

In another aspect combinable with any one of the previous aspects, the non-conductive covering comprises a fiberglass sheath.

In another general implementation, a method for containing spent nuclear fuel material includes removing at least one spent nuclear fuel assembly from a nuclear reactor module; placing the at least one spent nuclear fuel assembly into an interior volume of a spent nuclear fuel canister, the spent nuclear fuel canister comprising a base portion and a middle portion attached to the base portion, the base and middle portions defining at least a part of the interior volume; and attaching a top portion of the spent nuclear fuel canister to the middle portion to enclose the at least one spent nuclear fuel assembly in the interior volume, the top and base portions comprising a shielding. The spent nuclear fuel canister is configured to store the at least one nuclear fuel assembly in an underground storage repository.

In an aspect combinable with the general implementation, the middle portion comprises a material configured to allow transmission of gamma rays therethrough.

In another aspect combinable with any one of the previous aspects, the material comprises a barrier to radioactive liquid, solid, and gas transmission therethrough.

In another aspect combinable with any one of the previous aspects, the radioactive gas comprises tritium gas.

In another aspect combinable with any one of the previous aspects, the middle portion comprises a circular cross-section.

In another aspect combinable with any one of the previous aspects, the bottom member is mechanically attached to the middle portion.

In another aspect combinable with any one of the previous aspects, the mechanical attachment comprises a weld.

In another aspect combinable with any one of the previous aspects, the shielding comprises a barrier to gamma ray transmission therethrough, and the shielding comprises a barrier to radioactive liquid and gas transmission therethrough.

In another aspect combinable with any one of the previous aspects, the interior volume comprises a height dimension of between about 12 feet and about 15 feet and a cross-sectional diameter of between 7 inches and 13 inches.

In another aspect combinable with any one of the previous aspects, the interior volume is sized to enclose a single spent nuclear fuel assembly.

In another aspect combinable with any one of the previous aspects, the interior volume comprises a height dimension of between about 24 feet and about 30 feet and a cross-sectional diameter of between 7 inches and 13 inches.

In another aspect combinable with any one of the previous aspects, the interior volume is sized to enclose two or more spent nuclear fuel assemblies that are linearly arranged in the interior volume.

In another aspect combinable with any one of the previous aspects, the unshielded material comprises stainless or carbon steel.

In another aspect combinable with any one of the previous aspects, the material comprises titanium or a nickel-chromium alloy.

Another aspect combinable with any one of the previous aspects further includes one or more rollers or bearings mounted to the middle portion.

Another aspect combinable with any one of the previous aspects further includes a non-conductive material attached to the middle portion.

In another aspect combinable with any one of the previous aspects, the non-conductive material comprises a plurality of quartz members attached to an exterior surface of the middle portion.

In another aspect combinable with any one of the previous aspects, at least a portion of the plurality of quartz members comprises spherical or partially-spherical quartz members.

Another aspect combinable with any one of the previous aspects further includes a non-conductive covering that encloses at least a portion of the non-conductive material.

In another aspect combinable with any one of the previous aspects, the non-conductive covering comprises a fiberglass sheath.

Another aspect combinable with any one of the previous aspects further includes moving the spent nuclear fuel canister through an entry of a drillhole that extends into a terranean surface, the entry at least proximate the terranean surface; moving the spent nuclear fuel canister through the drillhole that comprises a substantially vertical portion, a transition portion, and a substantially horizontal portion, the spent nuclear fuel canister sized to fit from the drillhole entry through the substantially vertical, the transition, and the substantially horizontal portions of the drillhole; moving the spent nuclear fuel canister into the underground storage repository that is coupled to the substantially horizontal portion of the drillhole, the underground storage repository located within or below a shale formation and vertically isolated, by the shale formation, from a subterranean zone that comprises mobile water; and forming a seal in the drillhole that isolates the storage portion of the drillhole from the entry of the drillhole.

In another aspect combinable with any one of the previous aspects, the underground storage repository is formed below the shale formation and is vertically isolated from the subterranean zone that comprises mobile water by the shale formation.

In another aspect combinable with any one of the previous aspects, the underground storage repository is formed within the shale formation, and is vertically isolated from the subterranean zone that comprises mobile water by at least a portion of the shale formation.

In another aspect combinable with any one of the previous aspects, the shale formation comprises geological properties comprising two or more of a permeability of less than about 0.01 millidarcys; a brittleness of less than about 10 MPa, where brittleness comprises a ratio of compressive stress of the shale formation to tensile strength of the shale formation; a thickness proximate the storage area of at least about 100 feet; or about 20 to 30% weight by volume of organic material or clay.

In another aspect combinable with any one of the previous aspects, the drillhole further comprises at least one casing that extends from at or proximate the terranean surface, through the drillhole, and into the underground storage repository.

Another aspect combinable with any one of the previous aspects further includes prior to moving the spent nuclear fuel canister through the entry of the drillhole that extends into the terranean surface, forming the drillhole from the terranean surface to the shale formation.

Another aspect combinable with any one of the previous aspects further includes installing a casing in the drillhole that extends from at or proximate the terranean surface, through the drillhole, and into the underground storage repository.

Another aspect combinable with any one of the previous aspects further includes cementing the casing to the drillhole.

Another aspect combinable with any one of the previous aspects further includes, subsequent to forming the drillhole, producing hydrocarbon fluid from the shale formation, through the drillhole, and to the terranean surface.

Another aspect combinable with any one of the previous aspects further includes removing the seal from the drillhole; and retrieving the spent nuclear fuel canister from the underground storage repository to the terranean surface.

Another aspect combinable with any one of the previous aspects further includes monitoring at least one variable associated with the spent nuclear fuel canister from a sensor positioned proximate the underground storage repository; and recording the monitored variable at the terranean surface.

In another aspect combinable with any one of the previous aspects, the monitored variable comprises at least one of radiation level, temperature, pressure, presence of oxygen, presence of water vapor, presence of liquid water, acidity, or seismic activity.

Another aspect combinable with any one of the previous aspects further includes, based on the monitored variable exceeding a threshold value removing the seal from the drillhole; and retrieving the spent nuclear fuel canister from the underground storage repository to the terranean surface.

Another aspect combinable with any one of the previous aspects further includes placing a cylindrical shield that comprises the shielded material around the entry to the drillhole; and lowering the spent nuclear fuel canister through the cylindrical shield and into the entry of the drillhole.

In another aspect combinable with any one of the previous aspects, moving the spent nuclear fuel canister into the underground storage repository that is coupled to the substantially horizontal portion of the drillhole comprises moving the spent nuclear fuel canister on at least one wheel or roller.

Implementations of a hazardous material canister according to the present disclosure may include one or more of the following features. For example, a hazardous material canister according to the present disclosure may provide for a faster and more economically efficient canister for long term storage and permanent disposal of spent nuclear fuel in particular storage locations. As another example, the hazardous material canister according to the present disclosure may allow for one or more spent nuclear fuel assemblies to move from a nuclear reactor, to one or more temporary storage locations (e.g., spent nuclear fuel pools, dry casks), and then to the canister in the same or substantially the same configuration, thereby reducing manpower hours and potential radiation exposure due to unpacking and repacking (perhaps several times) the fuel rods from the assembly. A hazardous material canister according to the present disclosure can also be more compact and lighter in weight than conventional containers used to store hazardous material, such as spent nuclear fuel, thereby improving safety while lowering the cost of handling such canisters. Further, a hazardous material according to the present disclosure that is unshielded at the sides but shielded at the ends may provide for the described advantages while also providing for the safe handling of the canisters above ground (e.g., between a nuclear reactor or spent nuclear fuel pool and a depository site). For example, a hazardous material canister that stores spent nuclear fuel can be slipped into a concrete (or steel or lead) container without a need to close the top or bottom of the container. That means, for example, that a connector (e.g., a handle, latch, or otherwise) at an end of the canister remains exposed for easy connection or disconnection, e.g. when the canister is placed in the upper part of a drillhole.

As described, a hazardous material canister according to the present disclosure may be stored in a hazardous material storage repository, which may allow for multiple levels of containment of hazardous material within a storage repository located thousands of feet underground, decoupled from any nearby mobile water. A hazardous material storage repository according to the present disclosure may also use proven techniques (e.g., drilling) to create or form a storage area for the hazardous material, in a subterranean zone. As another example, a hazardous material storage repository according to the present disclosure may provide long-term (e.g., thousands of years) storage for hazardous material (e.g., radioactive waste) in a formation (such as shale, salt, and other rock formations) that has geologic properties suitable for such storage, including low permeability, thickness, and ductility, among others. In addition, a greater volume of hazardous material may be stored at low cost— relative to conventional storage techniques due in part to directional drilling techniques that facilitate long horizontal boreholes, often exceeding a mile in length. In addition, rock formations that have geologic properties suitable for such storage may be found in close proximity to sites at which hazardous material may be found or generated, thereby reducing dangers associated with transporting such hazardous material.

Implementations of a hazardous material storage repository according to the present disclosure may also include one or more of the following features. Large storage volumes, in turn, allow for the storage of hazardous materials to be emplaced without a need for complex prior treatment, such as concentration or transfer to different forms or canisters. As a further example, in the case of nuclear waste material from a reactor for instance, the waste can be kept in its original pellets, unmodified, or in its original fuel rods, or in its original fuel assemblies, which contain typically between 60 and 270 fuel rods. In another aspect, the hazardous material may be kept in an original holder but a cement or other material is injected into the holder to fill the gaps between the hazardous materials and the structure. For example, if the hazardous material is stored in fuel rods which are, in turn, stored in fuel assemblies, then the spaces between the rods (typically filled with water when inside a nuclear reactor) could be filled with cement, bentonite, or other material to provide yet an additional layer of isolation from the outside world. The material could be low oxygen, replaced by nitrogen or an inert gas, to reduce corrosion. As yet a further example, secure and low cost storage of hazardous material is facilitated while still permitting retrieval of such material if circumstances deem it advantageous to recover the stored materials.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
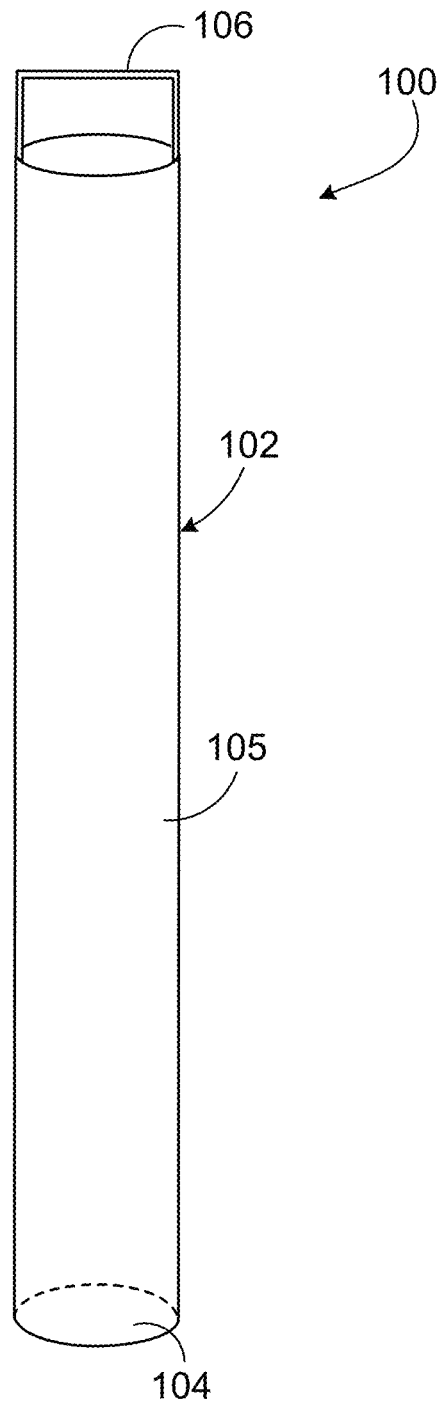
FIG. 1A is a schematic illustrations of an example implementation of a hazardous material canister according to the present disclosure.
Figure 2A:
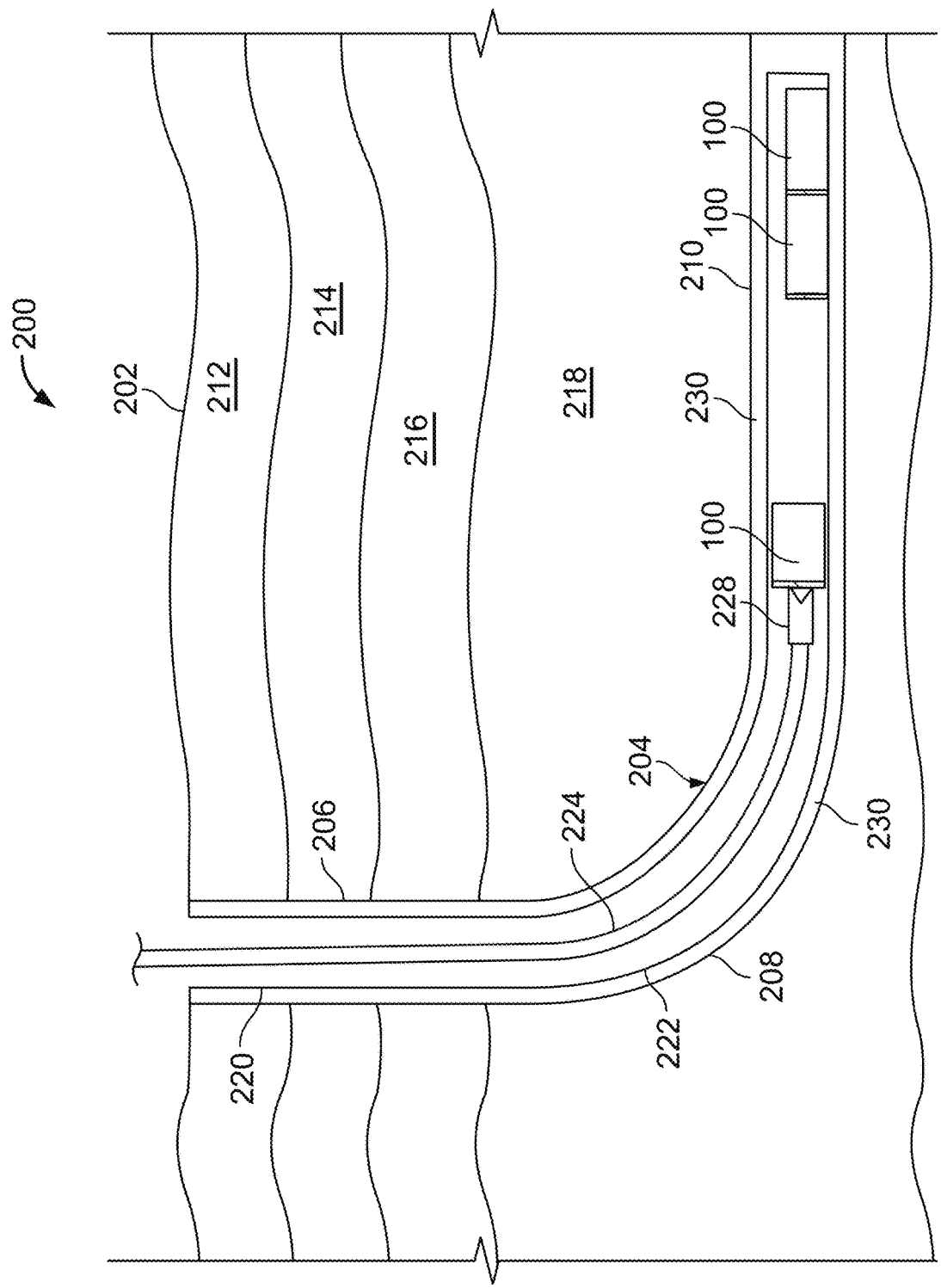
FIGS. 2A-2C are schematic illustrations of example implementations of a hazardous material storage repository system during a deposit or retrieval operation according to the present disclosure.
Figure 2B:
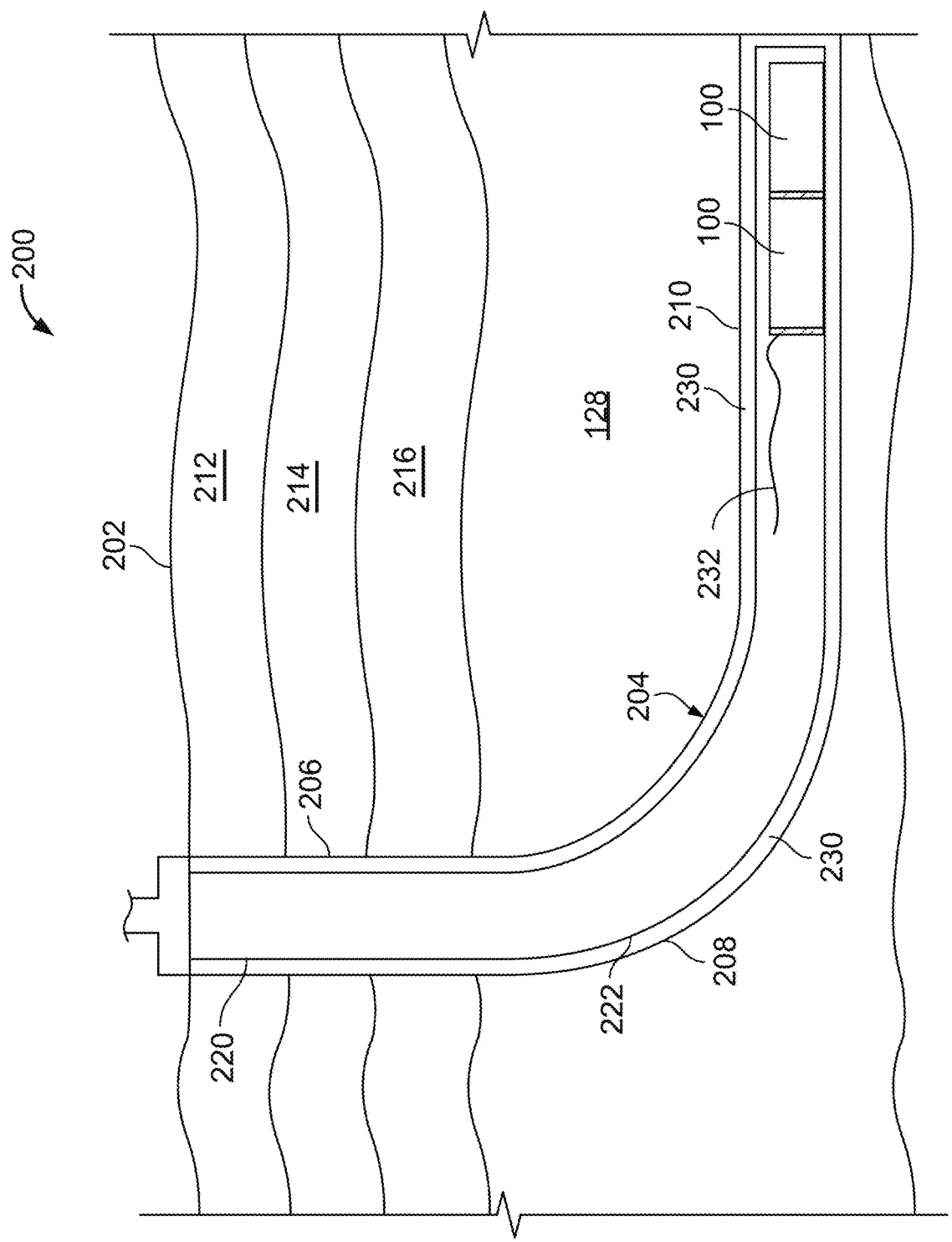
Figure 2C:
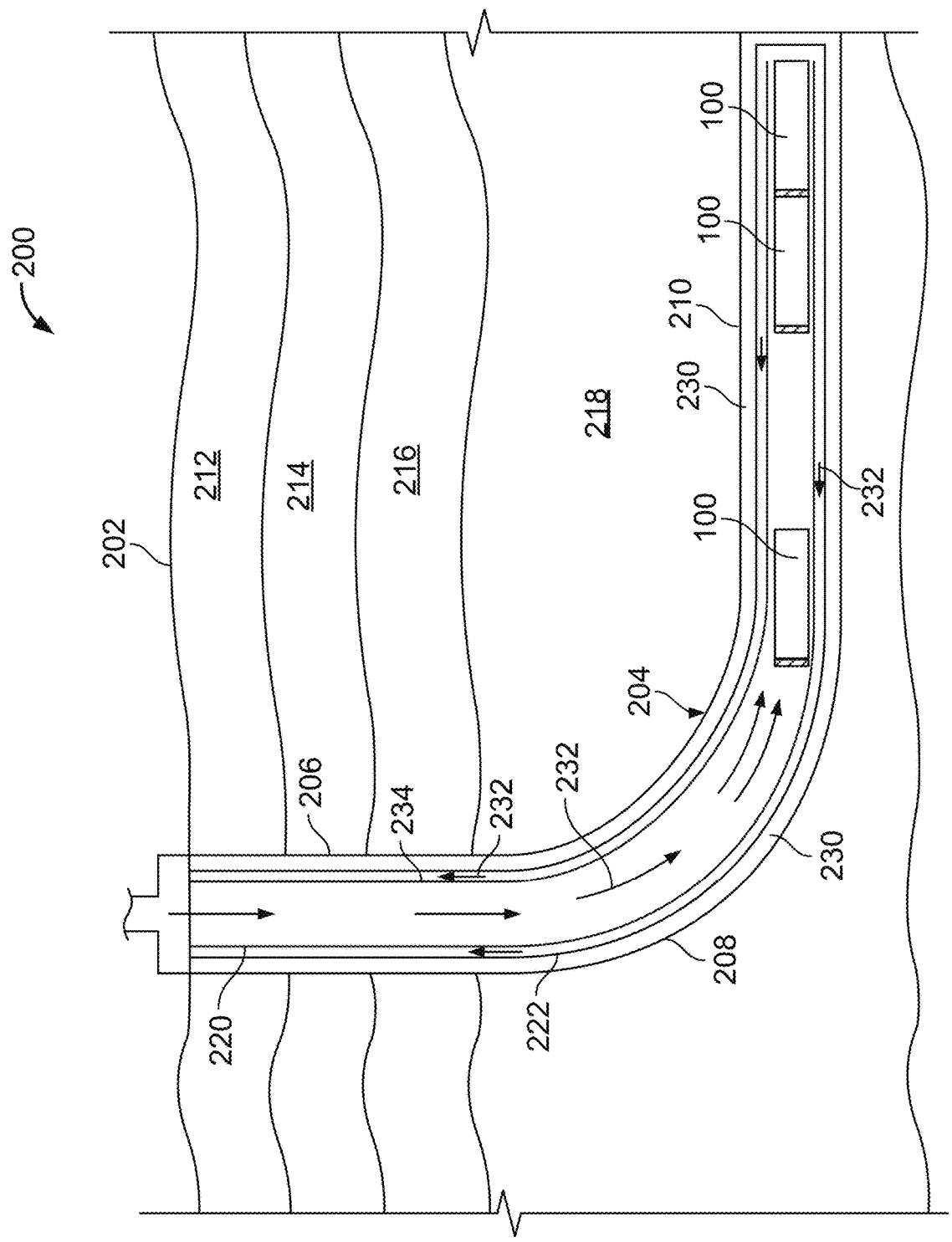

FIG. 1A is a schematic illustration of an example implementation of a hazardous material canister 100 according to the present disclosure. FIG. 1A illustrates an isometric view of the hazardous material canister 100. In some aspects, the hazardous material canister 100 may be usable in a hazardous material storage repository system 200, as shown in FIGS. 2A-2C, or other hazardous material storage repository system according to the present disclosure. The hazardous material canister 100 may be used to store chemical hazardous material, biological hazardous material, nuclear hazardous material, or otherwise. For example, in the illustrated implementation, the hazardous material canister 100 stores spent nuclear fuel in the form of one or more spent nuclear fuel assemblies.

Figure 1B:
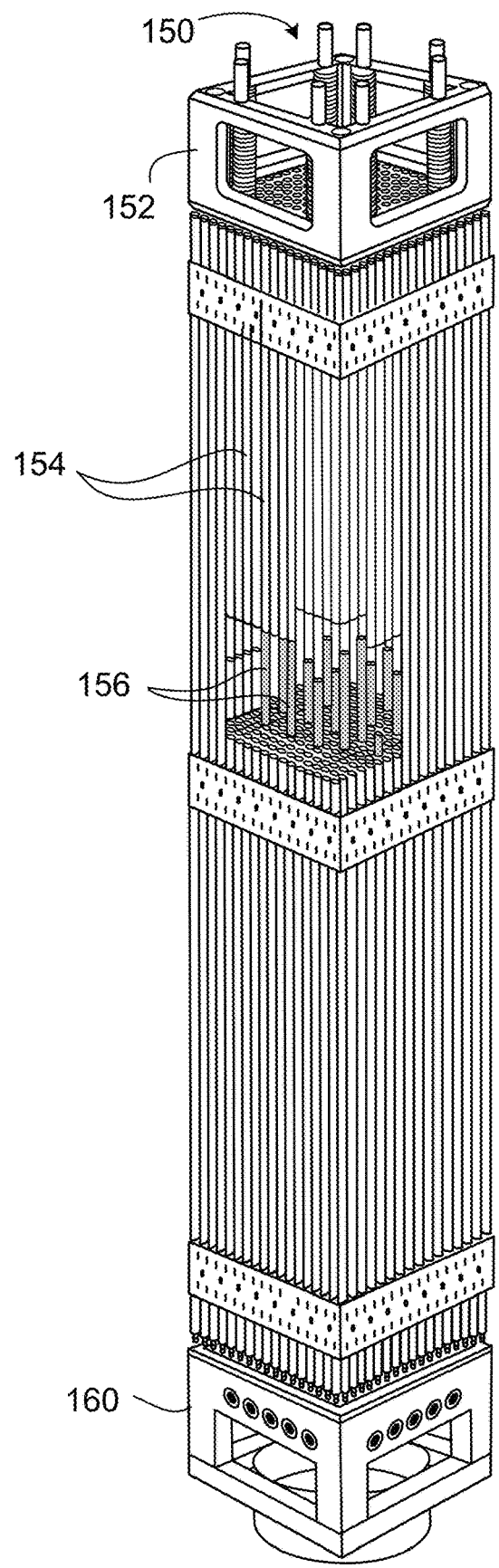
FIG. 1B is an illustration of a spent nuclear fuel assembly that may be contained in the hazardous material canister of FIG. 1A upon removal from a nuclear reactor.

As illustrated, the hazardous material canister 100 includes a housing 102 (e.g., a crush resistant housing) with a top portion 106 and a bottom portion 104 that, collectively, enclose a volume 105 to store the hazardous material. The housing 102, or middle portion 102 of the canister, in this example, is shown as having a circular cross-section, to accommodate a general shape of a spent nuclear fuel assembly (as shown in FIG. 1B). However, other implementations of the canister 100 may have other cross-sectional shapes, such as oval, square, or otherwise.

The top and bottom portions 106 and 104 may be made from, or include, a shielding that is of a material of composition and thickness that forms a barrier to the transmission (into the canister 100 or out of the canister 100) of any hazardous material (liquid, gas, or solid) therethrough. The shielding also reduces an intensity of a radiation to a level that allows safe handling of the canister 100 (e.g., by human operators). In some aspects, the shielding may be lead, tungsten, steel, titanium, nickel, or concrete, or an alloy or combination of such materials with a thickness sufficient to form a sufficient barrier to the transmission of radiation, such as gamma rays and x-rays (collectively, "gamma rays"), therethrough. The shielding on the top and bottom portions 106 and 104 allows for easier handling of the canisters with enhanced safety to people in its vicinity. An example thickness is between 2 and 4 inches for a lead shielding, and between 3 and 5 feet for a concrete shielding.

In example implementations of the hazardous material canister 100, the middle portion 102 may be made from a material of a composition and thickness that forms a barrier to the transmission (into the canister 100 or out of the canister 100) of any hazardous material (liquid, gas, or solid) therethrough, but is not a barrier to gamma rays. Further, in some aspects, the unshielded material may be steel, such as carbon steel, with a thickness sufficient to form a barrier to the transmission of any hazardous material (fluid or solid) therethrough, but is not a barrier to gamma rays. In particular implementations, the barrier to leakage of liquid, gas, or solid might be made from alloy-22 (a nickel alloy) which is also used for the middle portion 102, and a layer of lead that is placed only at the ends of the canister 100 to prevent gamma radiation from escaping in the direction of the long axis of the canister 100.

Hazardous waste, and particular nuclear material waste such as spent nuclear fuel, may take several forms, such as solid, liquid, and gas. For example, the solid form of the nuclear waste in spent nuclear fuel may be or includes nuclear fuel pellets formed from, e.g., sintered uranium. A gaseous form of the nuclear waste may be, for example, tritium gas (or gas containing other radioisotopes) that may off-gas from the solid nuclear waste or be entrained in liquid that comes into contact with the solid nuclear waste. A liquid form of the nuclear waste may be, for example, any liquid that comes into contact with the solid or gaseous nuclear waste and absorbs some of the solid or gaseous nuclear waste material.

As shown in the example hazardous material canister 100 shown in FIG. 1A, the interior volume 105 may be sized (and shaped) to receive one or more spent nuclear fuel assemblies (e.g., arranged end-to-end), such as spent nuclear fuel assembly 150 shown in FIG. 1B. Turning briefly to FIG. 1B, a single nuclear fuel assembly 150 is shown. The nuclear fuel assembly 150, also referred to as a "spent nuclear fuel assembly" 150 to signify when it has been removed from a nuclear reactor, such as a pressurized water reactor or other type of reactor, due to end-of-life operational occurrence, includes a top portion 152 and a bottom portion 160 between which are held multiple (e.g., 60-300) nuclear fuel rods 154.

As shown, the nuclear fuel assembly 150 also includes multiple control rods 156 positioned amongst the nuclear fuel rods 154; the control rods 156 may be adjustably positioned (vertically, within the assembly), during operation (e.g., fission) of the nuclear fuel assembly 150 in a reactor vessel of a nuclear reactor, to control the nuclear reaction taking place in the reactor. Such control rods 156 may be removed from the nuclear fuel assembly 150 upon removal of the assembly 150 from the reactor. Thus, a spent nuclear fuel assembly 150 may not include the control rods 156. Notably, as well, the nuclear fuel assembly 150 does not include any gamma or x-ray shielding that surrounds the nuclear fuel rods 154 positioned in the assembly 150.

Figure 1C:
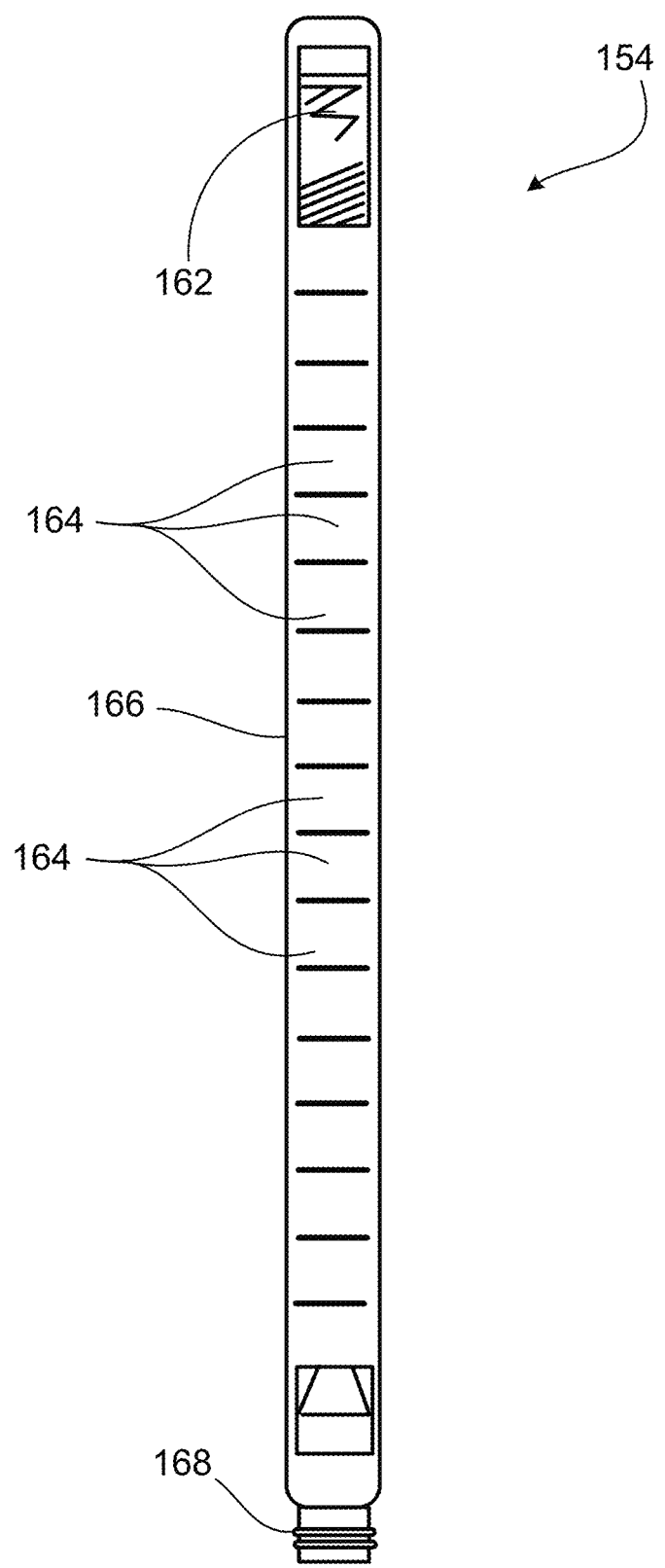
FIG. 1C is an illustration of a spent nuclear fuel rod that is part of the spent nuclear fuel assembly of FIG. 1B.

Turning briefly to FIG. 1C, an example nuclear fuel rod 154 is illustrated. The nuclear fuel rod 154 includes multiple (e.g., 300 or more) nuclear fuel pellets 164 encased in a cladding 166 (e.g., a zirconium alloy cladding). Each of the nuclear fuel pellets 164 may be formed of, for example, sintered uranium dioxide. One or more springs 162 may be positioned at a top portion of the rod 154 to hold the fuel pellets 164 sturdily within the cladding 166. A base 168 is provided at the bottom of the fuel rod 154 to fit within the nuclear fuel assembly 150.

The example nuclear fuel assembly 150 may be, for example, between 12 and 15 feet tall (e.g., from bottom of bottom portion 160 to top of top portion 152). Further, the width and length dimensions may be, for example, about 5.5 to 8.5 inches each (e.g., each side of the substantially square cross-section is between about 5.5 and 8.5 inches). Thus, in some aspects, the canister 100 may have a height of between 12 and 15 feet (to store a single spent nuclear fuel assembly 150) and a diameter of between 7 and 13 inches.

Returning to FIG. 1A, the top portion 106 (and, in some aspects, the bottom portion 104) of the illustrated hazardous material canister 100 may include a connector portion. In some aspects, the connector portion may facilitate coupling of the hazardous material canister 100 to a downhole tool (e.g., downhole tool 228 shown in FIG. 2A) to permit deposit and retrieval of the hazardous material canister 100 to and from storage in a drillhole. Further, the connector portion may facilitate coupling of one hazardous material canister 100 to another hazardous material canister 100. The connector portion, in some aspects, may be a threaded connection. For example, a connector portion on one end of the canister 100 may be a male threaded connection while a connector portion on the opposite end of the canister 100 may be a female threaded connection. In alternative aspects, the connector portion may be an interlocking latch, such that rotation (e.g., 360 degrees or less) may latch (or unlatch) the canister 100 to a downhole tool or other hazardous material canister 100. In alternative aspects, the connector portion may include one or more magnets (e.g., rare Earth magnets, electromagnets, a combination thereof, or otherwise) which attractingly couple to, e.g., a downhole tool or another hazardous material canister 100.

In this example, one or more spent nuclear fuel assemblies 150 is positioned in the interior volume 105 prior to sealing of the hazardous material canister 100. As described, each spent nuclear fuel rod 154 comprises multiple spent nuclear fuel pellets 164 bounded on the ends. For example, the spent nuclear fuel pellets 164 contain most of the radioisotopes (including the tritium) of the spent nuclear fuel removed from a nuclear reactor. The cladding of the nuclear fuel rods 154 offers an additional level of containment.

In some aspects, the dimensions of the hazardous material canister 100 may be specified so as to enclose a single spent nuclear fuel assembly 150 that may be taken directly from a nuclear reactor and placed in the interior volume 105 (e.g., without any change or without substantive change to the spent nuclear fuel assembly 150). In some aspects, the dimensions of the hazardous material canister 100 may be specified so as to enclose two or more spent nuclear fuel assemblies 150 that may be taken directly from a nuclear reactor and placed vertically (e.g., end to end) in the interior volume 105.

Further, the dimensions of the hazardous material canister 100, generally, may be designed to fit in a drillhole, such as the drillhole 204. Example dimensions of the canister 100 may include a length, L, of between 12 and 15 feet, and, in the case of a circular canister 100, diameter between 7 and 13 inches. The canister 100, in alternative aspects, may have a square cross-section sized to hold a spent nuclear fuel assembly 150. In some examples, the hazardous material canister 100 may be sized (e.g., length and width/diameter) for efficient deposit and retrieval into and from the drillhole 204. For example, the length may be determined based on, e.g., the radius dimension of the radiussed portion 208, to ensure that the hazardous material canister 100 may be moved through the radiussed portion 208 and into the substantially horizontal portion 210. As another example, the diameter may be determined based on a diameter of one or more of the casings in the drillhole 204, such as the surface casing 220 and the production casing 222.

Figure 1D:
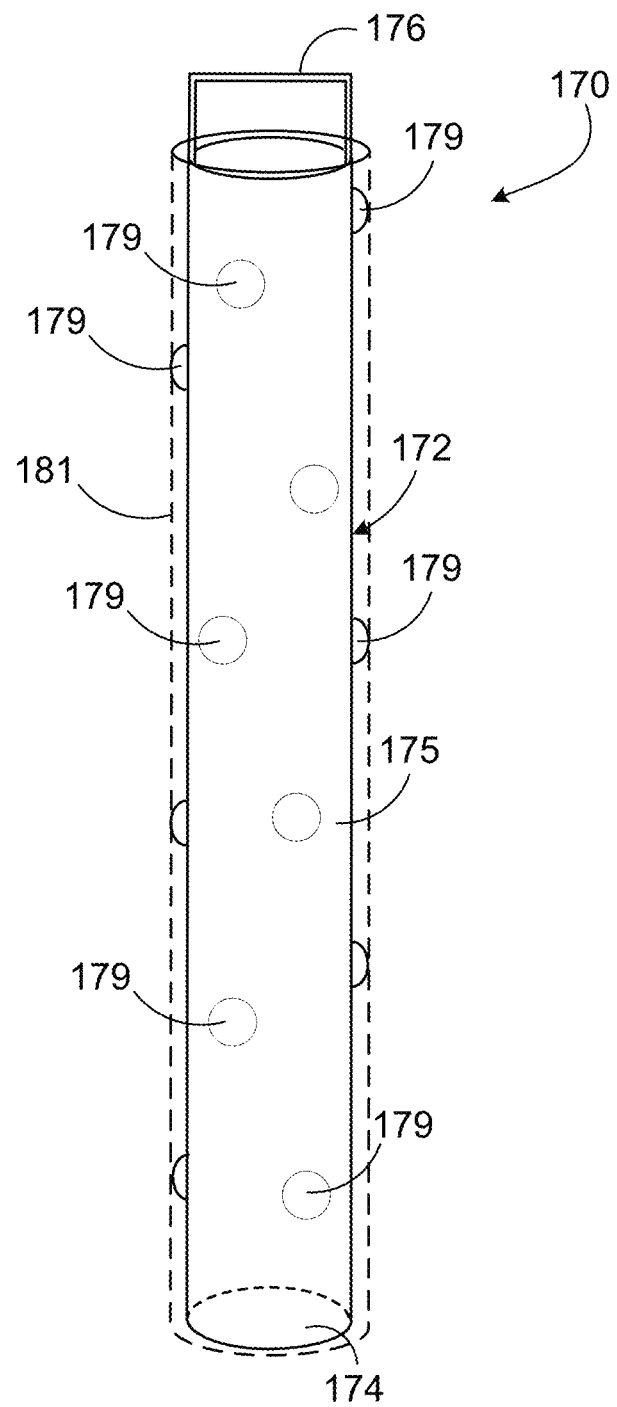
FIG. 1D is a schematic illustration of another example implementation of a hazardous material canister according to the present disclosure.

FIG. 1D is a schematic illustration of another example implementation of a hazardous material canister 170 according to the present disclosure. FIG. 1D illustrates an isometric view of the hazardous material canister 170. In some aspects, the hazardous material canister 170 may be usable in a hazardous material storage repository system 200, along with or in place of canister 100, or other hazardous material storage repository system according to the present disclosure. The hazardous material canister 170 may be used to store chemical hazardous material, biological hazardous material, nuclear hazardous material, or otherwise. For example, in the illustrated implementation, the hazardous material canister 170 stores spent nuclear fuel in the form of one or more spent nuclear fuel assemblies.

As illustrated, the hazardous material canister 170 includes a housing 172 (e.g., a crush resistant housing) with a top portion 176 and a bottom portion 174 that, collectively, enclose a volume 175 to store the hazardous material. The housing 172, or middle portion 172 of the canister, in this example, is shown as having a circular cross-section, to accommodate a general shape of a spent nuclear fuel assembly (as shown in FIG. 1B). However, other implementations of the canister 170 may have other cross-sectional shapes, such as oval, square, or otherwise.

The top and bottom portions 176 and 174 may be made from, or include, a shielding that is of a material of composition and thickness that forms a barrier to the transmission (into the canister 170 or out of the canister 170) of any hazardous material (liquid, gas, or solid) therethrough. The shielding also reduces an intensity of a radiation to a level that allows safe handling of the canister 170 (e.g., by human operators). In some aspects, the shielding may be lead, tungsten, steel, titanium, nickel, or concrete, or an alloy or combination of such materials with a thickness sufficient to form a sufficient barrier to the transmission of radiation, such as gamma rays therethrough. The shielding on the top and bottom portions 176 and 174 allows for easier handling of the canisters with enhanced safety to people in its vicinity. An example thickness is between 2 and 4 inches for a lead shielding, and between 3 and 5 feet for a concrete shielding.

In example implementations of the hazardous material canister 170, the middle portion 172 may be made from a material of a composition and thickness that forms a barrier to the transmission (into the canister 170 or out of the canister 170) of any hazardous material (liquid, gas, or solid) therethrough, but is not a barrier to gamma rays. Further, in some aspects, the unshielded material may be steel, such as carbon steel, with a thickness sufficient to form a barrier to the transmission of any hazardous material (fluid or solid) therethrough, but is not a barrier to gamma rays and x-rays.

Hazardous waste, and particular nuclear material waste such as spent nuclear fuel, may take several forms, such as solid, liquid, and gas. For example, the solid form of the nuclear waste in spent nuclear fuel may be or includes nuclear fuel pellets formed from, e.g., sintered uranium. A gaseous form of the nuclear waste may be, for example, tritium gas (or gas containing other radioisotopes) that may off-gas from the solid nuclear waste or be entrained in liquid that comes into contact with the solid nuclear waste. A liquid form of the nuclear waste may be, for example, any liquid that comes into contact with the solid or gaseous nuclear waste and absorbs some of the solid or gaseous nuclear waste material.

As shown in the example hazardous material canister 170 shown in FIG. 1D, the interior volume 175 may be sized (and shaped) to receive one or more spent nuclear fuel assemblies (e.g., arranged end-to-end), such as spent nuclear fuel assembly 150 shown in FIG. 1B. The space in the fuel assembly could be filled with gas (such as nitrogen), with powder (such as bentonite), with liquid (such as a liquid hydrocarbon), or with a solid (such as cement or epoxy) or with a combination (such as oil and bentonite, or fiberglass, which consists of glass fibers and epoxy).

The top portion 176 (and, in some aspects, the bottom portion 174) of the illustrated hazardous material canister 170 may include a connector portion. In some aspects, the connector portion may facilitate coupling of the hazardous material canister 170 to a downhole tool (e.g., downhole tool 228 shown in FIG. 2A) to permit deposit and retrieval of the hazardous material canister 170 to and from storage in a drillhole. Further, the connector portion may facilitate coupling of one hazardous material canister 170 to another hazardous material canister 170. The connector portion, in some aspects, may be a threaded connection. For example, a connector portion on one end of the canister 170 may be a male threaded connection while a connector portion on the opposite end of the canister 170 may be a female threaded connection. In alternative aspects, the connector portion may be an interlocking latch, such that rotation (e.g., 360 degrees or less) may latch (or unlatch) the canister 170 to a downhole tool or other hazardous material canister 170. In alternative aspects, the connector portion may include one or more magnets (e.g., rare Earth magnets, electromagnets, a combination thereof, or otherwise) which attractingly couple to, e.g., a downhole tool or another hazardous material canister 170.

In this example, one or more spent nuclear fuel assemblies 150 is positioned in the interior volume 175 prior to sealing of the hazardous material canister 170. As described, each spent nuclear fuel rod 154 comprises multiple spent nuclear fuel pellets 164 bounded on the ends. For example, the spent nuclear fuel pellets 164 contain most of the radioisotopes (including the tritium) of the spent nuclear fuel removed from a nuclear reactor. The cladding of the nuclear fuel rods 154 offers an additional level of containment.

In some aspects, the dimensions of the hazardous material canister 170 may be specified so as to enclose a single spent nuclear fuel assembly 150 that may be taken directly from a nuclear reactor and placed in the interior volume 175 (e.g., without any change or without substantive change to the spent nuclear fuel assembly 150). In some aspects, the dimensions of the hazardous material canister 170 may be specified so as to enclose two or more spent nuclear fuel assemblies 150 that may be taken directly from a nuclear reactor and placed vertically (e.g., end to end) in the interior volume 175.

Further, the dimensions of the hazardous material canister 170, generally, may be designed to fit in a drillhole, such as the drillhole 204. Example dimensions of the canister 170 may include a length, L, of between 12 and 15 feet, and, in the case of a circular canister 170, diameter between 7 and 13 inches. The canister 170, in alternative aspects, may have a square cross-section sized to hold a spent nuclear fuel assembly 150. In some examples, the hazardous material canister 170 may be sized (e.g., length and width/diameter) for efficient deposit and retrieval into and from the drillhole 204. For example, the length may be determined based on, e.g., the radius dimension of the radiussed portion 208, to ensure that the hazardous material canister 170 may be moved through the radiussed portion 208 and into the substantially horizontal portion 210. As another example, the diameter may be determined based on a diameter of one or more of the casings in the drillhole 204, such as the surface casing 220 and the production casing 222.

As shown in FIG. 1D, hazardous material canister 170 includes an electrically non-conductive ("non-conductive") material mounted to an exterior surface of the canister 170 in the form of multiple non-conductive members 179. The non-conductive material (non-conductive member 179) may not conduct electricity. Thus, in some aspects, the non-conductive material may prevent a direct electrically conductive ("conductive") path for electricity between the canister 170 and, for example, a casing in a drillhole in which the canister 170 is stored. Thus, to the extent a material of the casing (e.g., carbon steel) and a material of the middle portion 175 (e.g., titanium, a nickel-chromium alloy such as alloy 22) form a "battery" (with a conductive liquid, such as brine, in the drillhole in between), the non-conductive material reduces the potential for an electrical current connecting the casing and the canister 170.

In some aspects, the non-conductive members 179 may be quartz members that are spherical or partially spherical in shape and are attached to the exterior surface of the middle portion 175. Other shapes (e.g., rod shaped, cube or partial-cube) are also contemplated for the non-conductive members 179 according to the present disclosure. Further, other non-conductive materials, such as glass, ceramic, plastic, rubber, may be used in place of quartz. Generally, quartz provided a non-conductive material that also does not degrade or disintegrate within the drillhole for hundreds if not thousands of years.

As further shown in FIG. 1D, a non-conductive sheath 181 covers at least a portion of the hazardous material canister 170 to enclose the non-conductive member 179. In some aspects, the non-conductive sheath 181 may be formed from a flexible, non-conductive material such as fiberglass. The non-conductive sheath 181 may provide for a reduced-friction surface that facilitates easier movement of the canister 170 through one or more drillholes. The non-conductive sheath 181 may also provide some protection to the non-conductive members 179 during movement of the canister 170 through one or more drillholes. In some aspects, the non-conductive sheath 181 may eventually erode or disintegrate during long-term storage of the hazardous material canister 170 in an underground storage repository.

FIGS. 2A-2C are schematic illustrations of example implementations of a hazardous material storage repository system, e.g., a subterranean location for the long-term (e.g., tens, hundreds, or thousands of years or more) but retrievable safe and secure storage of hazardous material, during a deposit or retrieval operation according to the present disclosure. For example, turning to FIG. 2A, this figure illustrates an example hazardous material storage repository system 200 during a deposit (or retrieval, as described below) process, e.g., during deployment of one or more canisters of hazardous material in a subterranean formation. As illustrated, the hazardous material storage repository system 200 includes a drillhole 204 formed (e.g., drilled or otherwise) from a terranean surface 202 and through multiple subterranean layers 212, 214, 216, and 218. Although the terranean surface 202 is illustrated as a land surface, terranean surface 202 may be a sub-sea or other underwater surface, such as a lake or an ocean floor or other surface under a body of water. Thus, the present disclosure contemplates that the drillhole 204 may be formed under a body of water from a drilling location on or proximate the body of water.

The illustrated drillhole 204 is a directional drillhole in this example of hazardous material storage repository system 200. For instance, the drillhole 204 includes a substantially vertical portion 206 coupled to a radiussed or curved portion 208, which in turn is coupled to a substantially horizontal portion 210. As used in the present disclosure, "substantially" in the context of a drillhole orientation, refers to drillholes that may not be exactly vertical (e.g., exactly perpendicular to the terranean surface 202) or exactly horizontal (e.g., exactly parallel to the terranean surface 202). Further, the substantially horizontal portion 210, in some aspects, may be a slant drillhole or other directional drillhole that is oriented between exactly vertical and exactly horizontal. Further, the substantially horizontal portion 210, in some aspects, may be a slant drillhole or other directional drillhole that is oriented to follow the slant of the formation. As illustrated in this example, the three portions of the drillhole 204—the vertical portion 206, the radiussed portion 208, and the horizontal portion 210—form a continuous drillhole 204 that extends into the Earth.

The illustrated drillhole 204 has a surface casing 220 positioned and set around the drillhole 204 from the terranean surface 202 into a particular depth in the Earth. For example, the surface casing 220 may be a relatively large-diameter tubular member (or string of members) set (e.g., cemented) around the drillhole 204 in a shallow formation. As used herein, "tubular" may refer to a member that has a circular cross-section, elliptical cross-section, or other shaped cross-section. For example, in this implementation of the hazardous material storage repository system 200, the surface casing 220 extends from the terranean surface through a surface layer 212. The surface layer 212, in this example, is a geologic layer comprised of one or more layered rock formations. In some aspects, the surface layer 212 in this example may or may not include freshwater aquifers, salt water or brine sources, or other sources of mobile water (e.g., water that moves through a geologic formation). In some aspects, the surface casing 212 may isolate the drillhole 204 from such mobile water, and may also provide a hanging location for other casing strings to be installed in the drillhole 204. Further, although not shown, a conductor casing may be set above the surface casing 212 (e.g., between the surface casing 212 and the surface 202 and within the surface layer 212) to prevent drilling fluids from escaping into the surface layer 212.

As illustrated, a production casing 222 is positioned and set within the drillhole 204 downhole of the surface casing 220. Although termed a "production" casing, in this example, the casing 222 may or may not have been subject to hydrocarbon production operations. Thus, the casing 222 refers to and includes any form of tubular member that is set (e.g., cemented) in the drillhole 204 downhole of the surface casing 220. In some examples of the hazardous material storage repository system 200, the production casing 222 may begin at an end of the radiussed portion 208 and extend throughout the substantially horizontal portion 210. The casing 222 could also extend into the radiussed portion 208 and into the vertical portion 206.

As shown, cement 230 is positioned (e.g., pumped) around the casings 220 and 222 in an annulus between the casings 220 and 222 and the drillhole 204. The cement 230, for example, may secure the casings 220 and 222 (and any other casings or liners of the drillhole 204) through the subterranean layers under the terranean surface 202. In some aspects, the cement 230 may be installed along the entire length of the casings (e.g., casings 220 and 222 and any other casings), or the cement 230 could be used along certain portions of the casings if adequate for a particular drillhole 202. The cement 230 can also provide an additional layer of confinement for the hazardous material in canisters 100.

The drillhole 204 and associated casings 220 and 222 may be formed with various example dimensions and at various example depths (e.g., true vertical depth, or TVD). For instance, a conductor casing (not shown) may extend down to about 120 feet TVD, with a diameter of between about 28 in. and 60 in. The surface casing 220 may extend down to about 2500 feet TVD, with a diameter of between about 22 in. and 48 in. An intermediate casing (not shown) between the surface casing 220 and production casing 222 may extend down to about 8000 feet TVD, with a diameter of between about 16 in. and 36 in. The production casing 222 may extend substantially horizontally (e.g., to case the substantially horizontal portion 210) with a diameter of between about 11 in. and 22 in. The foregoing dimensions are merely provided as examples and other dimensions (e.g., diameters, TVDs, lengths) are contemplated by the present disclosure. For example, diameters and TVDs may depend on the particular geological composition of one or more of the multiple subterranean layers (212-218), particular drilling techniques, as well as a size, shape, or design of a hazardous material canister 100 that contains hazardous material to be deposited in the hazardous material storage repository system 200. In some alternative examples, the production casing 222 (or other casing in the drillhole 204) could be circular in cross-section, elliptical in cross-section, or some other shape.

As illustrated, the vertical portion 206 of the drillhole 204 extends through subterranean layers 212, 214, and 216, and, in this example, lands in a subterranean layer 219. As discussed above, the surface layer 212 may or may not include mobile water. Subterranean layer 214, which is below the surface layer 212, in this example, is a mobile water layer 214. For instance, mobile water layer 214 may include one or more sources of mobile water, such as freshwater aquifers, salt water or brine, or other source of mobile water. In this example of hazardous material storage repository system 200, mobile water may be water that moves through a subterranean layer based on a pressure differential across all or a part of the subterranean layer. For example, the mobile water layer 214 may be a permeable geologic formation in which water freely moves (e.g., due to pressure differences or otherwise) within the layer 214. In some aspects, the mobile water layer 214 may be a primary source of human-consumable water in a particular geographic area. Examples of rock formations of which the mobile water layer 214 may be composed include porous sandstones and limestones, among other formations.

Other illustrated layers, such as the impermeable layer 216 and the storage layer 219, may include immobile water. Immobile water, in some aspects, is water (e.g., fresh, salt, brine), that is not fit for human or animal consumption, or both. Immobile water, in some aspects, may be water that, by its motion through the layers 216 or 219 (or both), cannot reach the mobile water layer 214, terranean surface 202, or both, within 10,000 years or more (such as to 1,000,000 years).

Below the mobile water layer 214, in this example implementation of hazardous material storage repository system 200, is an impermeable layer 216. The impermeable layer 216, in this example, may not allow mobile water to pass through. Thus, relative to the mobile water layer 214, the impermeable layer 216 may have low permeability, e.g., on the order of nanodarcy permeability. Additionally, in this example, the impermeable layer 216 may be a relatively non-ductile (i.e., brittle) geologic formation. One measure of non-ductility is brittleness, which is the ratio of compressive stress to tensile strength. In some examples, the brittleness of the impermeable layer 216 may be between about 20 MPa and 40 MPa.

As shown in this example, the impermeable layer 216 is shallower (e.g., closer to the terranean surface 202) than the storage layer 219. In this example rock formations of which the impermeable layer 216 may be composed include, for example, certain kinds of sandstone, mudstone, limestone, clay, and slate that exhibit permeability and brittleness properties as described above. In alternative examples, the impermeable layer 216 may be deeper (e.g., further from the terranean surface 202) than the storage layer 219. In such alternative examples, the impermeable layer 216 may be composed of an igneous rock, such as granite or basalt.

Below the impermeable layer 216 is a storage layer 218. The storage layer 218, in this example, may be chosen as the landing for the substantially horizontal portion 210, which stores the hazardous material, for several reasons. Relative to the impermeable layer 216 or other layers, the storage layer 218 may be thick, e.g., between about 100 and 200 feet of total vertical thickness. Thickness of the storage layer 218 may allow for easier landing and directional drilling, thereby allowing the substantially horizontal portion 210 to be readily emplaced within the storage layer 218 during constructions (e.g., drilling). The landing layer could consist of more than one geologic formation; for example, it could consist of a layer of shale above a layer of sandstone. If formed through an approximate horizontal center of the storage layer 218, the substantially horizontal portion 210 may be surrounded by about 50 to 100 feet of the geologic formation that comprises the storage layer 218. Further, the storage layer 218 may also have little or no mobile water, e.g., due to a very low permeability of the layer 218 (e.g., on the order of micro- or nanodarcys). In addition, the storage layer 218 may have sufficient ductility, such that a brittleness of the rock formation that comprises the layer 218 is between about 3 MPa and 10 MPa. Examples of rock formations of which the storage layer 218 may be composed include: shale and anhydrite. Further, in some aspects, hazardous material may be stored below the storage layer, even in a permeable formation such as sandstone or limestone, if the storage layer is of sufficient geologic properties to isolate the permeable layer from the mobile water layer 214.

In some examples implementations of the hazardous material storage repository system 200, the storage layer 218 is composed of shale. Shale, in some examples, may have properties that fit within those described above for the storage layer 218. For example, shale formations may be suitable for a long-term confinement of hazardous material (e.g., in the hazardous material canisters 100), and for their isolation from mobile water layer 214 (e.g., aquifers) and the terranean surface 202. Shale formations may be found relatively deep in the Earth, typically 3000 feet or greater, and placed in isolation below any fresh water aquifers.

Shale formations, for instance, may include geologic properties that enhance the long-term (e.g., thousands of years) isolation of material. Such properties, for instance, have been illustrated through the long term storage (e.g., tens of millions of years) of hydrocarbon fluids (e.g., gas, liquid, mixed phase fluid) without escape of such fluids into surrounding layers (e.g., mobile water layer 214). Indeed, shale has been shown to hold natural gas for millions of years or more, giving it a proven capability for long-term storage of hazardous material. Example shale formations (e.g., Marcellus, Eagle Ford, Barnett, and otherwise) has stratification that contains many redundant sealing layers that have been effective in preventing movement of water, oil, and gas for millions of years, lacks mobile water, and can be expected (e.g., based on geological considerations) to seal hazardous material (e.g., fluids or solids) for thousands of years after deposit.

Shale formations may also be at a suitable depth, e.g., between 3000 and 12,000 feet TVD. Such depths are typically below ground water aquifer (e.g., surface layer 212 and/or mobile water layer 214). Further, the presence of soluble elements in shale, including salt, and the absence of these same elements in aquifer layers, demonstrates a fluid isolation between shale and the aquifer layers.

Another particular quality of shale that may advantageously lend itself to hazardous material storage is its clay content, which, in some aspects, provides a measure of ductility greater than that found in other impermeable rock formations (e.g., impermeable layer 216). For example, shale may be stratified, made up of thinly alternating layers of clays (e.g., between about 20-30% clay by volume) and other minerals. Such a composition may make shale less brittle and, thus less susceptible to fracturing (e.g., naturally or otherwise) as compared to rock formations in the impermeable layer (e.g., granite or otherwise). For example, rock formations in the impermeable layer 216 may have suitable permeability for the long term storage of hazardous material, but are too brittle and commonly are fractured. Thus, such formations may not have sufficient sealing qualities (as evidenced through their geologic properties) for the long term storage of hazardous material.

The present disclosure contemplates that there may be many other layers between or among the illustrated subterranean layers 212, 214, 216, and 218. For example, there may be repeating patterns (e.g., vertically), of one or more of the mobile water layer 214, impermeable layer 216, and storage layer 218. Further, in some instances, the storage layer 218 may be directly adjacent (e.g., vertically) the mobile water layer 214, i.e., without an intervening impermeable layer 216.

FIG. 2A illustrates an example of a deposit operation of hazardous material in the substantially horizontal portion 210 of the drillhole 204. For example, as shown, a work string 224 (e.g., tubing, coiled tubing, wireline, or otherwise) may be extended into the cased drillhole 204 to place one or more (three shown but there may be more or less) hazardous material canisters 100 into long term, but in some aspects, retrievable, storage in the portion 210. For example, in the implementation shown in FIG. 2A, the work string 224 may include a downhole tool 228 that couples to the canister 100, and with each trip into the drillhole 204, the downhole tool 228 may deposit a particular hazardous material canister 100 in the substantially horizontal portion 210.

The downhole tool 228 may couple to the canister 100 by, in some aspects, a threaded connection. In alternative aspects, the downhole tool 228 may couple to the canister 100 with an interlocking latch, such that rotation of the downhole tool 228 may latch to (or unlatch from) the canister 100. In alternative aspects, the downhole tool 224 may include one or more magnets (e.g., rare Earth magnets, electromagnets, a combination thereof, or otherwise) which attractingly couple to the canister 100. In some examples, the canister 100 may also include one or more magnets (e.g., rare Earth magnets, electromagnets, a combination thereof, or otherwise) of an opposite polarity as the magnets on the downhole tool 224. In some examples, the canister 100 may be made from or include a ferrous or other material attractable to the magnets of the downhole tool 224.

As another example, each canister 100 may be positioned within the drillhole 204 by a drillhole tractor (e.g., on a wireline or otherwise), which may push or pull the canister into the substantially horizontal portion 210 through motorized (e.g., electric) motion. As yet another example, each canister 100 may include or be mounted to rollers (e.g., wheels or bearings), so that the downhole tool 224 may push the canister 100 into the cased drillhole 204.

In some example implementations, the canister 100, one or more of the drillhole casings 220 and 222, or both, may be coated with a friction-reducing coating prior to the deposit operation. For example, by applying a coating (e.g., petroleum-based product, resin, ceramic, or otherwise) to the canister 100 and/or drillhole casings, the canister 100 may be more easily moved through the cased drillhole 204 into the substantially horizontal portion 210. In some aspects, only a portion of the drillhole casings may be coated. For example, in some aspects, the substantially vertical portion 206 may not be coated, but the radiussed portion 208 or the substantially horizontal portion 210, or both, may be coated to facilitate easier deposit and retrieval of the canister 100.

FIG. 2A also illustrates an example of a retrieval operation of hazardous material in the substantially horizontal portion 210 of the drillhole 204. A retrieval operation may be the opposite of a deposit operation, such that the downhole tool 224 (e.g., a fishing tool) may be run into the drillhole 204, coupled to the last-deposited canister 100 (e.g., threadingly, latched, by magnet, or otherwise), and pull the canister 100 to the terranean surface 202. Multiple retrieval trips may be made by the downhole tool 224 in order to retrieve multiple canisters from the substantially horizontal portion 210 of the drillhole 204.

Each canister 100 may enclose hazardous material. Such hazardous material, in some examples, may be biological or chemical waste or other biological or chemical hazardous material. In some examples, the hazardous material may include nuclear material, such as spent nuclear fuel recovered from a nuclear reactor (e.g., commercial power or test reactor) or military nuclear material. For example, a typical gigawatt nuclear plant may produce 30 tons of spent nuclear fuel per year. The density of that fuel is typically close to 10 (10 gm/cm$^3$=10 kg/liter), so that the volume for a year of nuclear waste is about 3 m$^3$. Spent nuclear fuel, in the form of nuclear fuel pellets, may be taken from the reactor and not modified. Nuclear fuel pellets are solid, and emit very little gas other than short-lived tritium (13 year half-life).

In some aspects, the storage layer 218 should be able to contain any radioactive output (e.g., gases) within the layer 218, even if such output escapes the canisters 100. For example, the storage layer 218 may be selected based on diffusion times of radioactive output through the layer 218. For example, a minimum diffusion time of radioactive output escaping the storage layer 218 may be set at, for example, fifty times a half-life for any particular component of the nuclear fuel pellets. Fifty half-lives as a minimum diffusion time would reduce an amount of radioactive output by a factor of $1 \times 10^{15}$. As another example, setting a minimum diffusion time to thirty half-lives would reduce an amount of radioactive output by a factor of one billion.

For example, plutonium-239 is often considered a dangerous waste product in spent nuclear fuel because of its long half-life of 24,100 years. For this isotope, 50 half-lives would be 1.2 million years. Plutonium-239 has low solubility in water, is not volatile, and as a solid is not capable of diffusion through a matrix of the rock formation that comprises the illustrated storage layer 218 (e.g., shale or other formation). The storage layer 218, for example comprised of shale, may offer the capability to have such isolation times (e.g., millions of years) as shown by the geological history of containing gaseous hydrocarbons (e.g., methane and otherwise) for several million years. In contrast, in conventional nuclear material storage methods, there was a danger that some plutonium might dissolve in a layer that comprised mobile ground water upon confinement escape.

Turning to FIG. 2B, in alternative implementations, a fluid 232 (e.g., liquid or gas) may be circulated through the drillhole 204 prior to inserting the canisters 100 into the substantially horizontal drillhole portion 210. In some aspects, the choice of fluid 232 may depend at least in part on a viscosity of the fluid 232. For example, a fluid 232 may be chosen with enough viscosity to impede the drop of the canister 100 into the substantially vertical portion 206. This resistance or impedance may provide a safety factor against a sudden drop of the canister 100. The fluid 232 may also provide lubrication to reduce a sliding friction between the canister 100 and the casings 220 and 222. The canister 100 can be conveyed within a casing filled with a liquid of controlled viscosity, density, and lubricant qualities. Also, a fluid-filled annulus between the inner diameter of the casings 220 and 222 and the outer diameter of the conveyed canister 100 represents an opening designed to dampen any high rate of canister motion, providing automatic passive protection in an unlikely decoupling of the conveyed canister 100.

In some aspects, the canister 100 may include flexible or inflatable extensions (e.g., mounted to the housing 102) that, in some aspects, can impede a flow of the fluid 232 (e.g., air or a drilling fluid) across the canister 100 during movement in the drillhole 204. For example, the flexible or inflatable extensions could also slow a freefall of the canister 100, such as if a latch or conveyance breaks.

In some aspects, other techniques may be employed to facilitate deposit of the canister 100 into the substantially horizontal portion 210. For example, one or more of the installed casings (e.g., casings 220 and 222) may have rails to guide the storage canister 100 into the drillhole 202 while reducing friction between the casings and the canister 100. The storage canister 100 and the casings (or the rails) may be made of materials that slide easily against one another. The casings may have a surface that is easily lubricated, or one that is self-lubricating when subjected to the weight of the storage canister 100.

Turning to FIG. 2C, another alternative deposit operation is illustrated. In this example deposit operation, the fluid 232 (e.g., liquid or gas) may be circulated through a tubular fluid control casing 234 to fluidly push the canisters 100 into the substantially horizontal drillhole portion 210. The fluid 232 may circulate through an end of the substantially horizontal portion 210 in the fluid control casing 234 and recirculate back to the terranean surface 202 in an annulus between the fluid control casing 234 and the casings 222 and 220. In some examples, each canister 100 may be fluidly pushed separately. The annulus between the fluid control casing 234 and the casings 220 and 222 may be filled with a fluid or compressed gas to reverse the flow of fluid 232, e.g., in order to push the canisters 100 back towards the terranean surface 202. In alternative aspects, two or more canisters 100 may be fluidly pushed, simultaneously, through the drillhole 204 for deposit into the substantially horizontal portion 210. The fluid control casing 234 could be similar or identical to the production casing 222. For that case, a separate tubular member could be enclosed in the drillhole 202 or within the production casing 222 to provide a return path for the fluid 232.

In some aspects, the drillhole 204 may be formed for the primary purpose of long-term storage of hazardous materials. In alternative aspects, the drillhole 204 may have been previously formed for the primary purpose of hydrocarbon production (e.g., oil, gas). For example, storage layer 218 may be a hydrocarbon bearing formation from which hydrocarbons were produced into the drillhole 204 and to the terranean surface 202. In some aspects, the storage layer 218 may have been hydraulically fractured prior to hydrocarbon production. Further in some aspects, the production casing 222 may have been perforated prior to hydraulic fracturing. In such aspects, the production casing 222 may be patched (e.g., cemented) to repair any holes made from the perforating process prior to a deposit operation of hazardous material. In addition, any cracks or openings in the cement between the casing and the drill hole can also be filled at that time.

For example, in the case of spent nuclear fuel as a hazardous material, the drillhole may be formed at a particular location, e.g., near a nuclear power plant, as a new drillhole provided that the location also includes an appropriate storage layer 218, such as a shale formation. Alternatively, an existing well that has already produced shale gas, or one that was abandoned as "dry," (e.g., with sufficiently low organics that the gas in place is too low for commercial development), may be selected as the drillhole 204. In some aspects, prior hydraulic fracturing of the storage layer 218 through the drillhole 204 may make little difference in the hazardous material storage capability of the drillhole 204. But such a prior activity may also confirm the ability of the storage layer 218 to store gases and other fluids for millions of years. If, therefore, the hazardous material or output of the hazardous material (e.g., radioactive gasses or otherwise) were to escape from the canister 100 and enter the fractured formation of the storage layer 218, such fractures may allow that material to spread relatively rapidly over a distance comparable in size to that of the fractures. In some aspects, the drillhole 202 may have been drilled for a production of hydrocarbons, but production of such hydrocarbons had failed, e.g., because the storage layer 218 comprised a rock formation (e.g., shale or otherwise) that was too ductile and difficult to fracture for production, but was advantageously ductile for the long-term storage of hazardous material.

The present disclosure, including FIGS. 2A-2C, describes a hazardous material storage repository system, which includes one or more drillholes formed into a subterranean zone to provide long-term (e.g., tens, hundreds, or even thousands of years) storage of hazardous material (e.g., biological, chemical, nuclear, or otherwise) in one or more underground storage volumes storage canisters. The subterranean zone includes multiple subterranean layers having different geological formations and properties. The storage canisters may be deposited in a particular subterranean layer based on one or more geologic properties of that layer, such as low permeability, sufficient thickness, low brittleness, and other properties. In some aspects, the particular subterranean layer comprises a shale formation, which forms an isolative seal between the storage canisters and another subterranean layer that comprises mobile water.

Referring generally to FIGS. 2A-2C, the example hazardous material storage repository system 200 (including hazardous material canisters 100) may provide for multiple layers of containment to ensure that a hazardous material (e.g., biological, chemical, nuclear) is sealingly stored in an appropriate subterranean layer. In some example implementations, there may be at least twelve levels of containment. In alternative implementations, a fewer or a greater number of containment levels may be employed.

First, using spent nuclear fuel as an example hazardous material, the fuel pellets are taken from the reactor and not modified. They may be made from sintered uranium dioxide, a ceramic, and may remain solid and emit very little gas other than short-lived tritium. Unless the pellets are exposed to extremely corrosive conditions or other effects that damage the multiple layers of containment, most of the radioisotopes (including the tritium) will be contained in the pellets.

Second, the fuel pellets are surrounded by the zircaloy tubes of the fuel rods, just as in the reactor. As described, the tubes could be mounted in the original fuel assemblies, or removed from those assemblies for tighter packing. Further, the hazardous material canister allows ease of handling with low risk of damage to the (potentially) fragile zircaloy tubes.

Third, the tubes are placed in the sealed housings of the hazardous material canister. The housing may be a unified structure or multi-panel structure, with the multiple panels (e.g., sides, top, bottom) mechanically fastened (e.g., screws, rivets, welds, and otherwise).

Fourth, a material (e.g., solid or fluid or powder) may fill the hazardous material canister to provide a further buffer between the material and the exterior of the canister.

Fifth, the hazardous material canister(s) are positioned (as described above), in a drillhole that is lined with a steel or other sealing casing that extends, in some examples, throughout the entire drillhole (e.g., a substantially vertical portion, a radiussed portion, and a substantially horizontal portion). The casing is cemented in place, providing a relatively smooth surface (e.g., as compared to the drillhole wall) for the hazardous material canister to be moved through, thereby reducing the possibility of a leak or break during deposit or retrieval. In some aspects, material from which the middle portion 105 of the canister 100 is made (the unshielded material) may be selected in order to reduce a likelihood of corrosion when the hazardous waste is emplaced and during a subsequent period of storage. For example, this subsequent period could be 300 years or it could be 10,000 years (as well as greater and less time periods).

Sixth, the cement that holds or helps hold the casing in place, may also provide a sealing layer to contain the hazardous material should it escape the canister.

Seventh, the hazardous material canister is stored in a portion of the drillhole (e.g., the substantially horizontal portion) that is positioned within a thick (e.g., 100-200 feet) seam of a rock formation that comprises a storage layer. The storage layer may be chosen due at least in part to the geologic properties of the rock formation (e.g., low mobile water, low permeability, thick, appropriate ductility or non-brittleness). For example, in the case of shale as the rock formation of the storage layer, this type of rock may offers a level of containment since it is known that shale has been a seal for hydrocarbon gas for millions of years. The shale may contain brine, but that brine is demonstrably immobile, and not in communication with surface fresh water.

Eighth, in some aspects, the rock formation of the storage layer may have other unique geological properties that offer another level of containment. For example, shale rock often contains reactive components, such as iron sulfide, that reduce the likelihood that hazardous materials (e.g., spent nuclear fuel and its radioactive output) can migrate through the storage layer without reacting in ways that reduce the diffusion rate of such output even further. Further, the storage layer may include components, such as clay and organic matter, which typically have extremely low diffusivity. For example, shale may be stratified and composed of thinly alternating layers of clays and other minerals. Such a stratification of a rock formation in the storage layer, such as shale, may offer this additional layer of containment.

Ninth, the storage layer may be located deeper than, and under, an impermeable layer, which separates the storage layer (e.g., vertically) from a mobile water layer.

Tenth, the storage layer may be selected based on a depth (e.g., 3000 to 12,000 ft.) of such a layer within the subterranean layers. Such depths are typically far below any layers that contain mobile water, and thus, the sheer depth of the storage layer provides an additional layer of containment.

Eleventh, example implementations of the hazardous material storage repository system of the present disclosure facilitate monitoring of the stored hazardous material. For example, if monitored data indicates a leak or otherwise of the hazardous material (e.g., change in temperature, radioactivity, or otherwise), or even tampering or intrusion of the canister, the hazardous material canister may be retrieved for repair or inspection.

Twelfth, the one or more hazardous material canisters may be retrievable for periodic inspection, conditioning, or repair, as necessary (e.g., with or without monitoring). Thus, any problem with the canisters may be addressed without allowing hazardous material to leak or escape from the canisters unabated.

Thirteenth, even if hazardous material escaped from the canisters and no impermeable layer was located between the leaked hazardous material and the terranean surface, the leaked hazardous material may be contained within the drillhole at a location that has no upward path to the surface or to aquifers (e.g., mobile water layers) or to other zones that would be considered hazardous to humans. For example, the location, which may be a dead end of an inclined drillhole, a J-section drillhole, or peaks of a vertically undulating drillhole, may have no direct upward (e.g., toward the surface) path to a vertical portion of the drillhole.

Figure 3A:
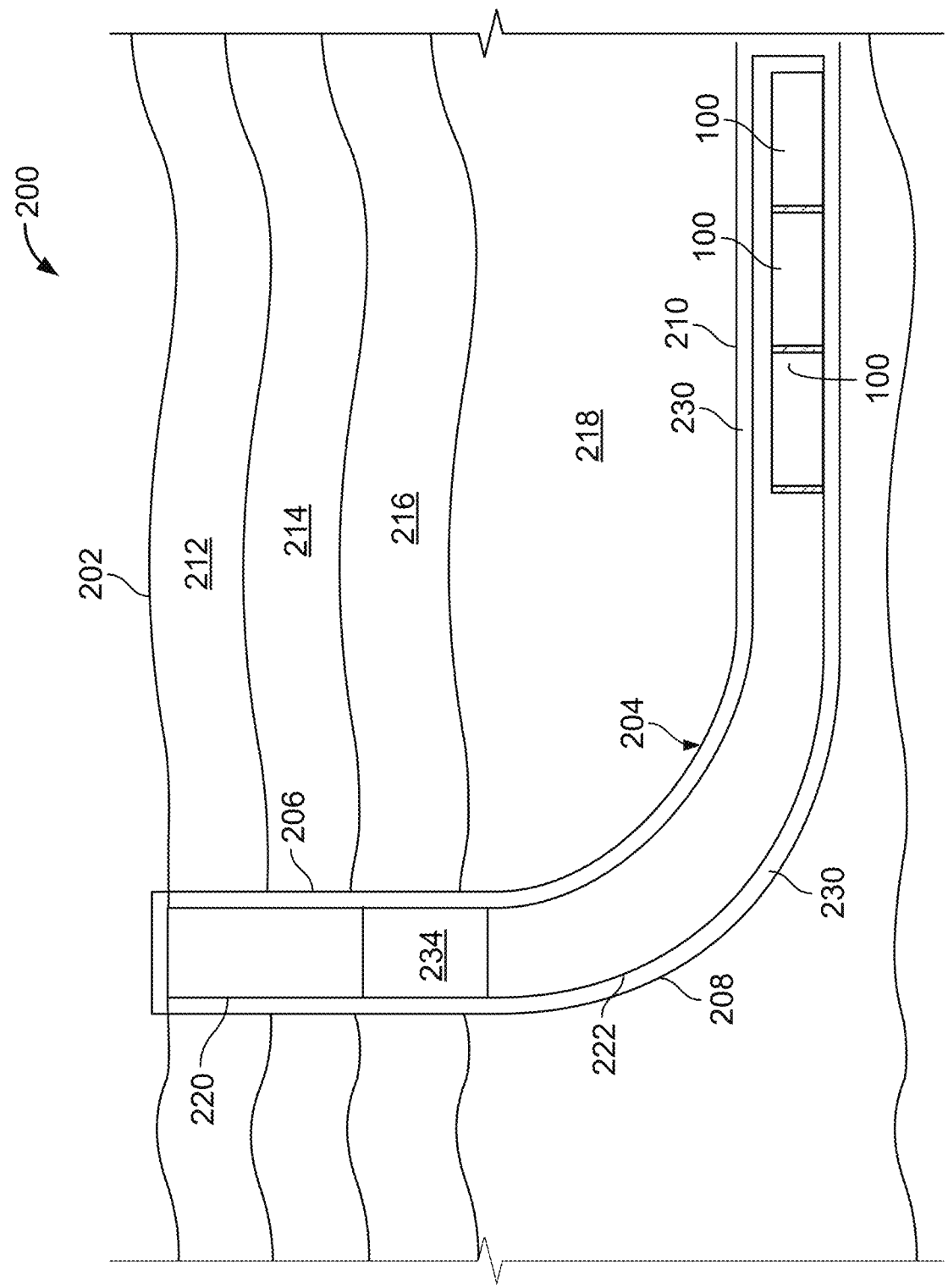
FIGS. 3A-3E are schematic illustrations of example implementations of a hazardous material storage repository system during storage and monitoring operations according to the present disclosure.

FIGS. 3A-3E are schematic illustrations of example implementations of a hazardous material storage repository system during storage and monitoring operations according to the present disclosure. For example, FIG. 3A illustrates the hazardous material storage repository system 200 in a long term storage operation. One or more hazardous material canisters 100 are positioned in the substantially horizontal portion 210 of the drillhole 204. A seal 234 is placed in the drillhole 204 between the location of the canisters 100 in the substantially horizontal portion 210 and an opening of the substantially vertical portion 206 at the terranean surface 202 (e.g., a well head). In this example, the seal 234 is placed at an uphole end of the substantially vertical portion 208. Alternatively, the seal 234 may be positioned at another location within the substantially vertical portion 206, in the radiussed portion 208, or even within the substantially horizontal portion 210 uphole of the canisters 100. In some aspects, the seal 234 may be placed at least deeper than any source of mobile water, such as the mobile water layer 214, within the drillhole 204. In some aspects, the seal 234 may be formed substantially along an entire length of the substantially vertical portion 206.

As illustrated, the seal 234 fluidly isolates the volume of the substantially horizontal portion 210 that stores the canisters 100 from the opening of the substantially vertical portion 206 at the terranean surface 202. Thus, any hazardous material (e.g., radioactive material) that does escape the canisters 100 may be sealed (e.g., such that liquid, gas, or solid hazardous material) does not escape the drillhole 204. The seal 234, in some aspects, may be a cement plug or other plug, that is positioned or formed in the drillhole 204. As another example, the seal 234 may be formed from one or more inflatable or otherwise expandable packers positioned in the drillhole 204.

Prior to a retrieval operation (e.g., as discussed with reference to FIGS. 2A-2B), the seal 234 may be removed. For example, in the case of a cement or other permanently set seal 234, the seal 234 may be drilled through or otherwise milled away. In the case of semi-permanent or removable seals, such as packers, the seal 234 may be removed from the drillhole 204 through a conventional process as is known.

Figure 3B:
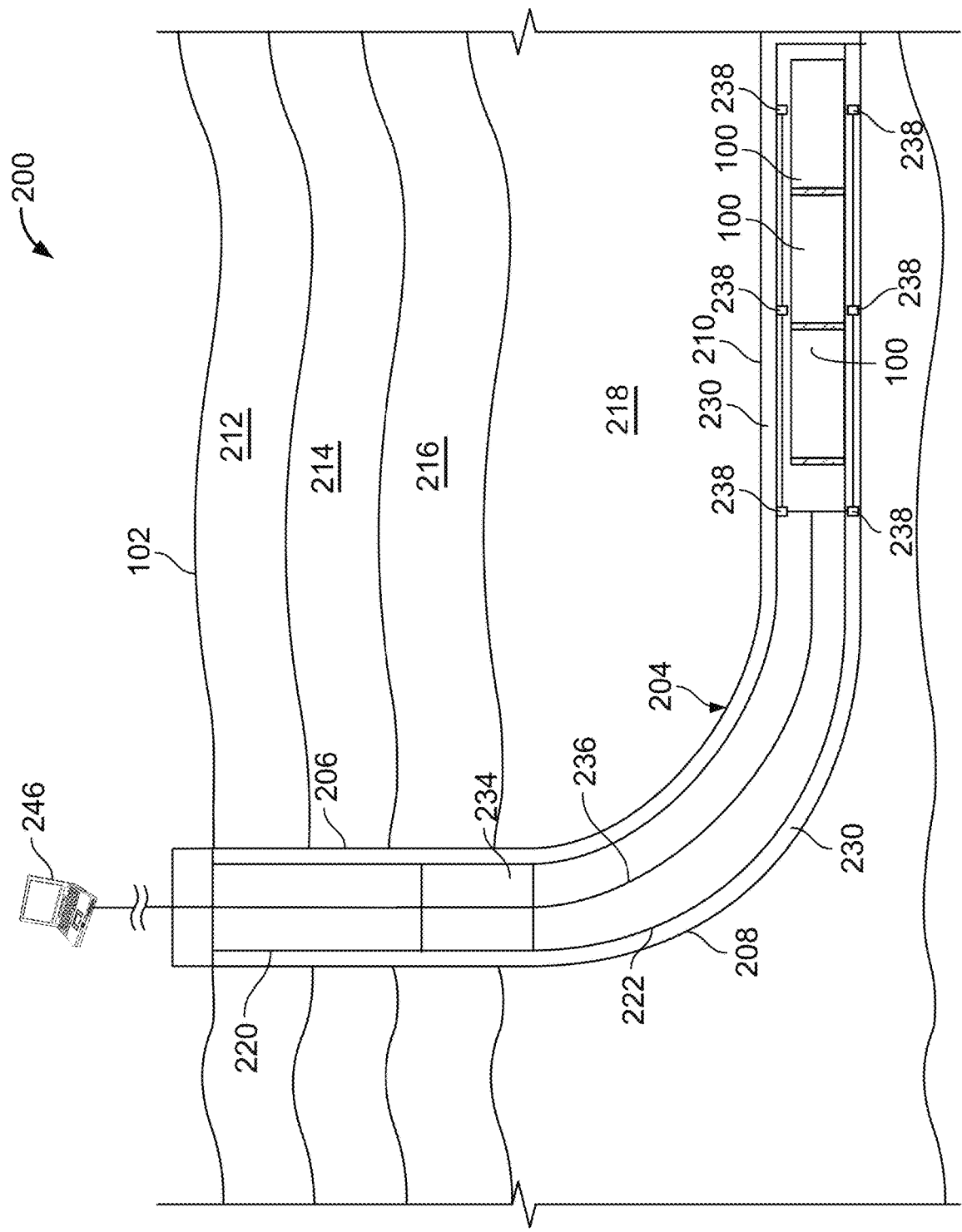

FIG. 3B illustrates an example monitoring operation during long term storage of the canisters 100. For example, in some aspects, it may be advantageous or required to monitor one or more variables during long term storage of the hazardous material in the canisters 100. In this example of FIG. 2B, the monitoring system includes one or more sensors 238 placed in the drillhole 204 (e.g., within the substantially horizontal portion 210) and communicably coupled to a monitoring control system 246 through a cable 236 (e.g., electrical, optical, hydraulic, or otherwise). Although illustrated as within drillhole 202 (e.g., inside of the casings), the sensors 238 may be placed outside of the casings, or even built into the casings before the casings are installed in the drillhole 202. Sensors 238 could also be placed outside the casing (e.g., casings 220 and/or 222), or outside the fluid control casing 234.

As shown, the sensors 238 may monitor one or more variables, such as, for example, radiation levels, temperature, pressure, presence of oxygen, a presence of water vapor, a presence of liquid water, acidity (pH), seismic activity, or a combination thereof. Data values related to such variables may be transmitted along the cable 236 to the monitoring control system 246. The monitoring control system 246, in turn, may record the data, determine trends in the data (e.g., rise of temperature, rise of radioactive levels), send data to other monitoring locations, such as national security or environmental center locations, and may further automatically recommend actions (e.g., retrieval of the canisters 100) based on such data or trends. For example, a rise in temperature or radioactive level in the drillhole 204 above a particular threshold level may trigger a retrieval recommendation, e.g., to ensure that the canisters 100 are not leaking radioactive material. In some aspects, there may be a one-to-one ratio of sensors 238 to canisters 100. In alternative aspects, there may be multiple sensors 238 per canister 100, or there may be fewer.

Figure 3C:
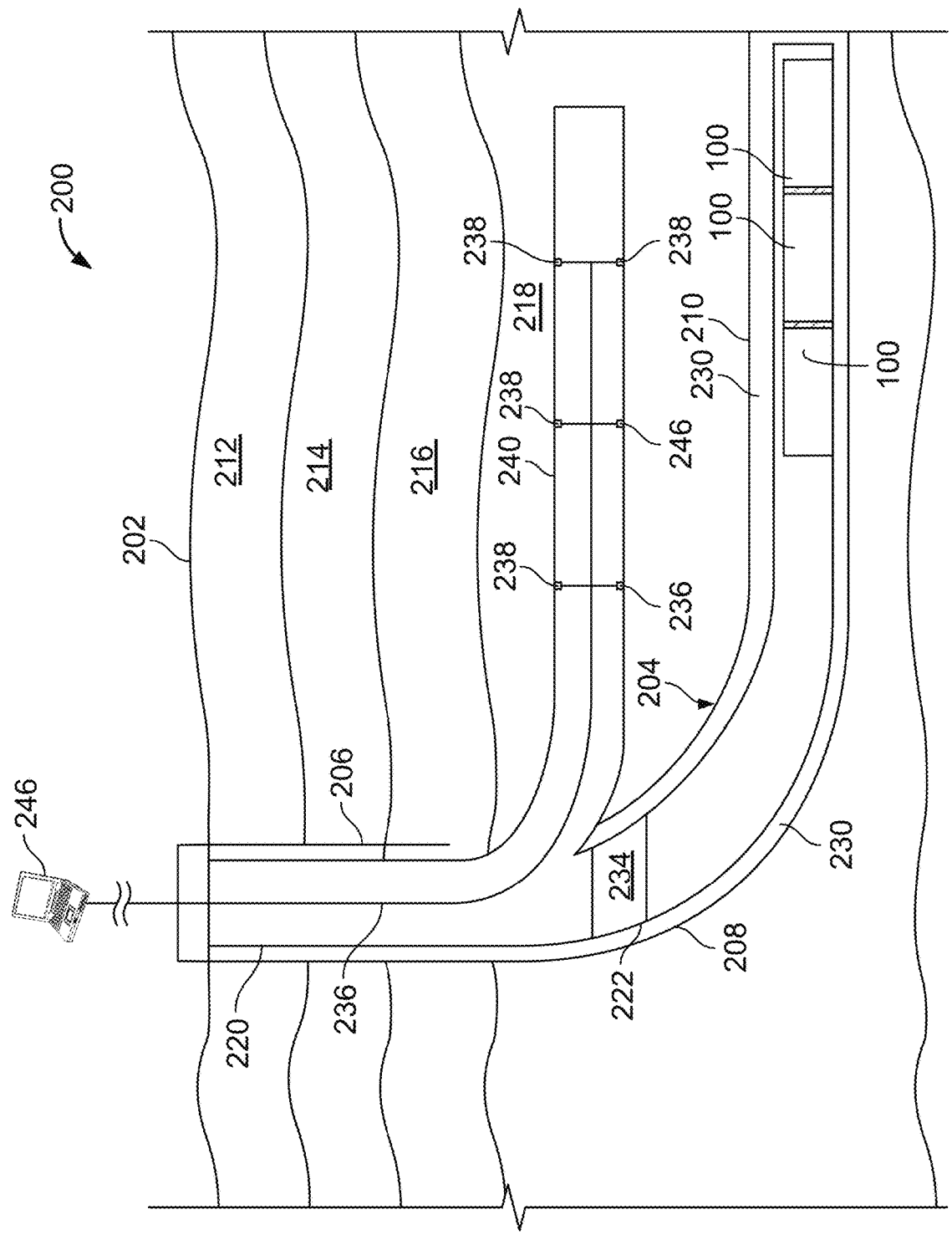

FIG. 3C shows another example monitoring operation during long term storage of the canisters 100. In this example, sensors 238 are positioned within a secondary horizontal drillhole 240 that is formed separately from the substantially vertical portion 206. The secondary horizontal drillhole 240 may be an uncased drillhole, through which the cable 236 may extend between the monitoring control system 246 and the sensors 238. In this example, the secondary horizontal drillhole 240 is formed above the substantially horizontal portion 210 but within the storage layer 218. Thus, the sensors 238 may record data (e.g., radiation levels, temperature, acidity, seismic activity) of the storage layer 218. In alternative aspects, the secondary horizontal drillhole 240 may be formed below the storage layer 218, above the storage layer in the impermeable layer 216, or in other layers. Further, although FIG. 3C shows the secondary horizontal drillhole 240 formed from the same substantially vertical portion 206 as the substantially horizontal portion 210, the secondary horizontal drillhole 240 may be formed from a separate vertical drillhole and radiussed drillhole.

Figure 3D:
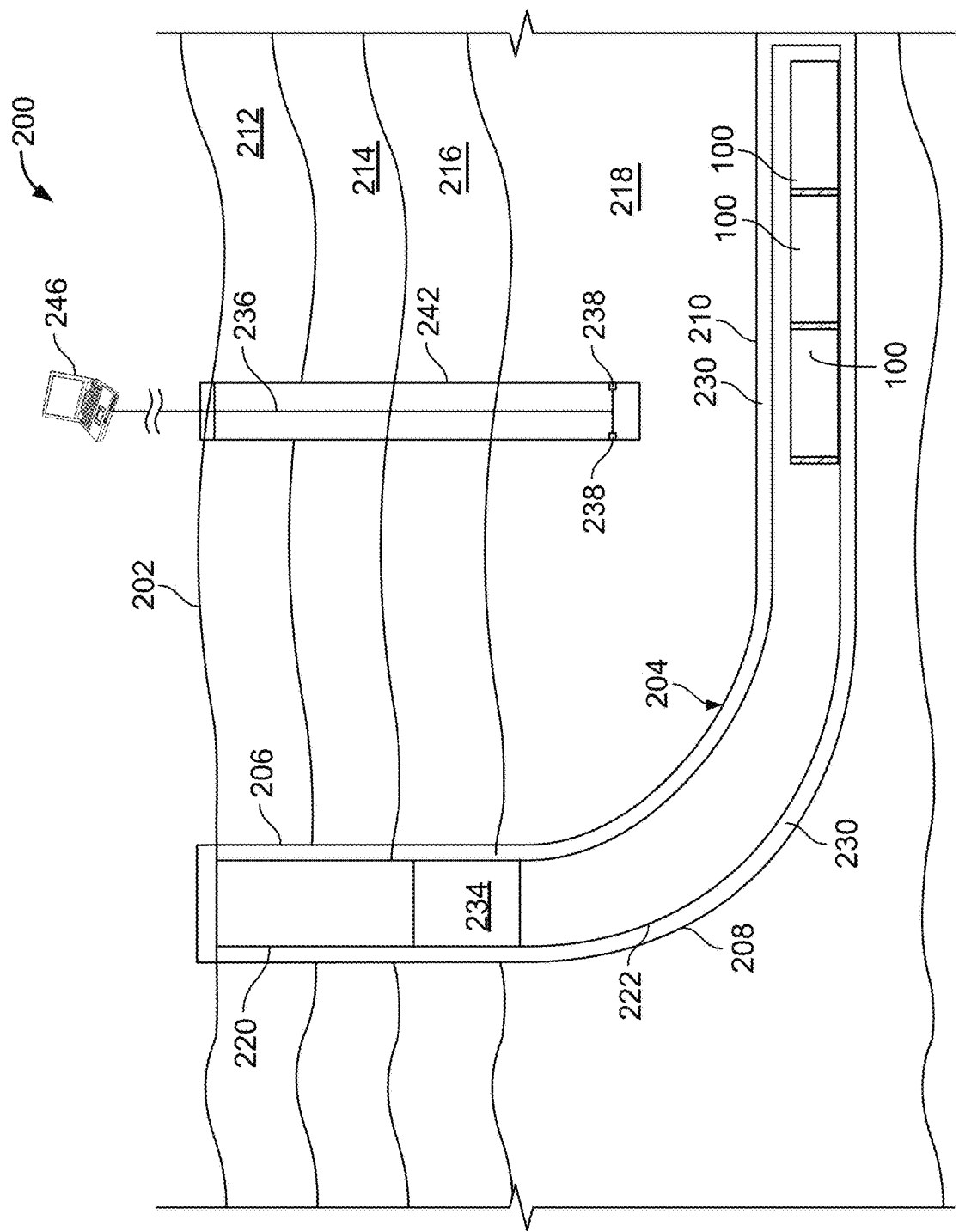

FIG. 3D shows another example monitoring operation during long term storage of the canisters 100. In this example, sensors 238 are positioned within a secondary vertical drillhole 242 that is formed separately from the drillhole 204. The secondary vertical drillhole 242 may be a cased or an uncased drillhole, through which the cable 236 may extend between the monitoring control system 246 and the sensors 238. In this example, the secondary vertical drillhole 242 bottoms out above the substantially horizontal portion 210 but within the storage layer 218. Thus, the sensors 238 may record data (e.g., radiation levels, temperature, acidity, seismic activity) of the storage layer 218. In alternative aspects, the secondary vertical drillhole 240 may bottom out below the storage layer 218, above the storage layer in the impermeable layer 216, or in other layers. Further, although shown placed in the secondary vertical drillhole 242 at a level adjacent the storage layer 218, sensors 238 may be placed anywhere within the secondary vertical drillhole 242. Alternatively, the secondary vertical drillhole 242 may, in some aspects, be constructed prior to drillhole 202, thereby permitting monitoring by installed sensors 238 during construction of the drillhole 202. Also, the monitoring borehole 242 could be sealed to prevent the possibility that material that leaks into borehole 242 would have a path to the terranean surface 202.

Figure 3E:
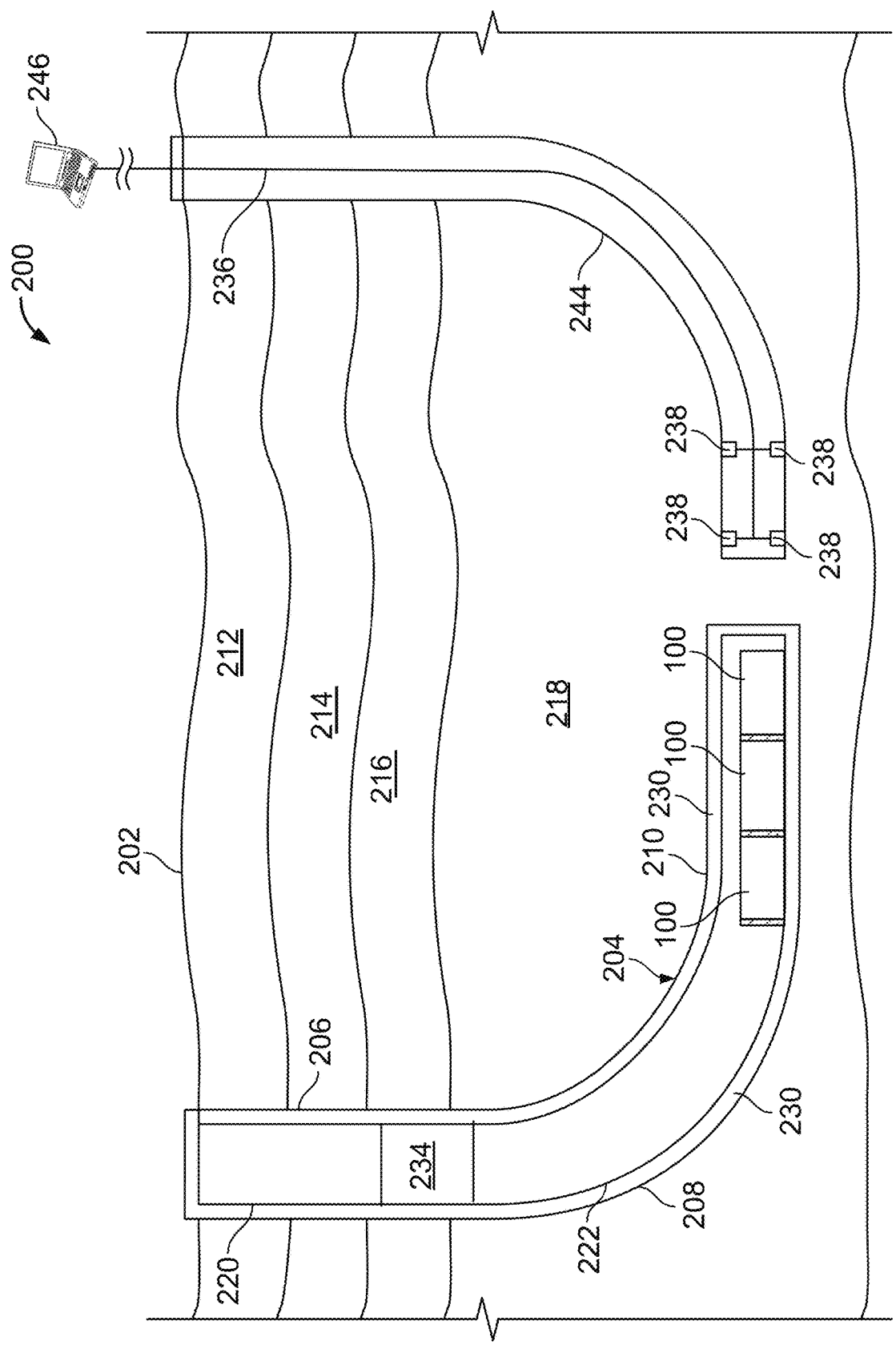

FIG. 3E shows another example monitoring operation during long term storage of the canisters 100. In this example, sensors 238 are positioned within a secondary directional drillhole 244 that is formed separately from the drillhole 204. The secondary directional drillhole 244 may be an uncased drillhole, through which the cable 236 may extend between the monitoring control system 246 and the sensors 238. In this example, the secondary directional drillhole 244 lands adjacent the substantially horizontal portion 210 and within the storage layer 218. Thus, the sensors 238 may record data (e.g., radiation levels, temperature, acidity, seismic activity) of the storage layer 218. In alternative aspects, the secondary directional drillhole 244 may land below the storage layer 218, above the storage layer in the impermeable layer 216, or in other layers. Further, although shown placed in the secondary directional drillhole 244 at a level adjacent the storage layer 218, sensors 238 may be placed anywhere within the secondary directional drillhole 244. In some aspects, the secondary directional drillhole 244 may be used for retrieval of the canisters 100, for example, in case the drillhole 204 is inaccessible.

Figure 4:
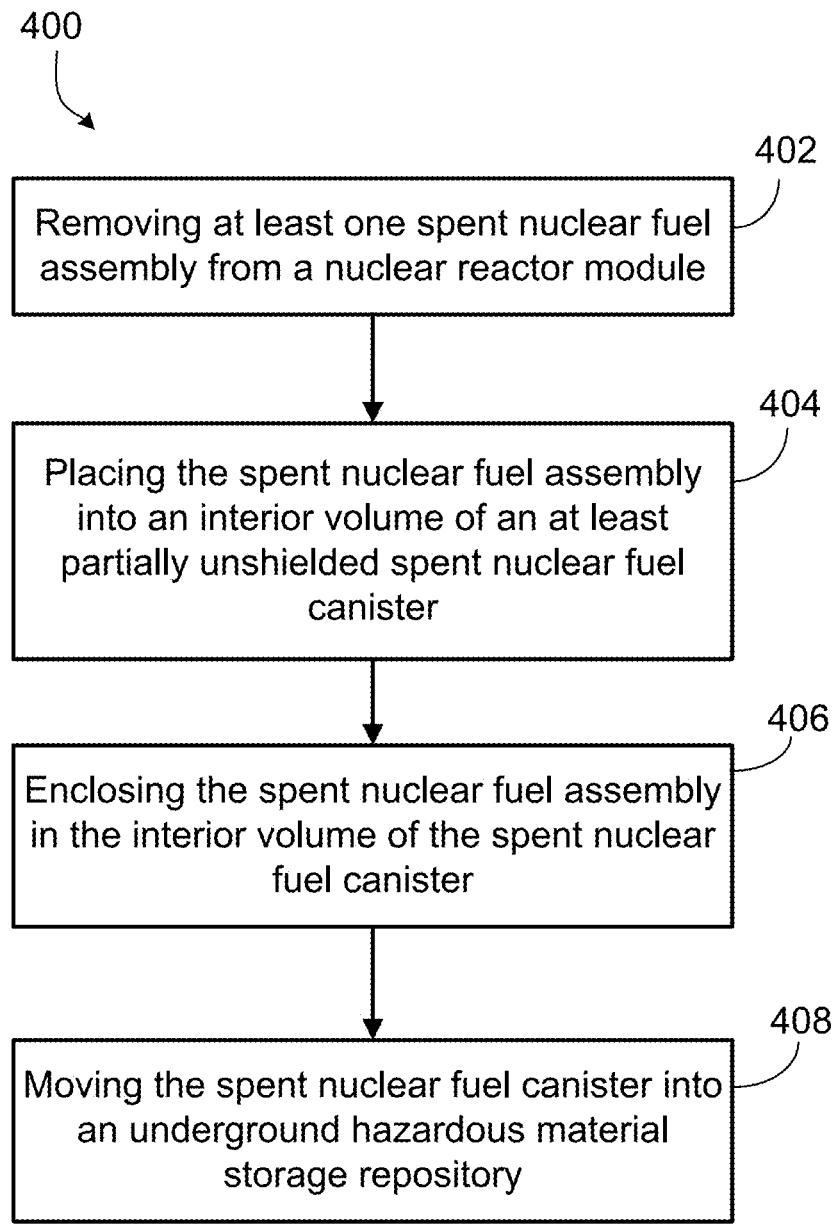
FIG. 4 is a flowchart that illustrates an example method associated with storing hazardous material according to the present disclosure.

FIG. 4 is a flowchart that illustrates an example method 400 associated with storing hazardous material, such as, for example, spent nuclear fuel contained in spent nuclear fuel assemblies. Method 400 may begin at step 402, which includes removing at least one spent nuclear fuel assembly from a nuclear reactor module. For example, nuclear fuel assemblies 150 may be part of a nuclear reactor during operation of the reactor to use the nuclear fissionable material in the assemblies 150 to generate, ultimately, electrical power. Once the nuclear fuel assemblies 150 reach their end-of-life, i.e., the nuclear fuel is spent, the spent nuclear fuel assemblies 150 may be removed from the nuclear reactor.

Method 400 may continue at step 404, which includes placing the spent nuclear fuel assembly into an interior volume of an at least partially unshielded spent nuclear fuel canister (for example, a canister that has shielding to gamma ray transmission on top and bottom ends but not a middle portion, such as canister 100). For example, spent nuclear fuel assembly 150 may be taken directly from reactor 170 and placed, without modification or without substantial modification, into the hazardous material canister 100. At least a portion of the hazardous material canister 100, such as the middle portion or housing 102, is made from a material that has no shielding to gamma ray transmission but may provide a barrier to the transmission of nuclear waste solids, liquid, and gases.

In some aspects, a single spent nuclear fuel assembly 150 is placed in the hazardous material canister 100 due to, e.g., the specified size and shape of the interior volume of the canister 100. In alternative aspects, two or more nuclear fuel assemblies 150 may be positioned, e.g., vertically and end-to-end, within the canister 100. Thus, the hazardous material canister 100 may have a height dimension sized to enclose only a single spent nuclear fuel assembly 150, or multiple spent nuclear fuel assemblies 150 (e.g., a height that is a multiple of a height dimension of the assembly 150). The canister 100 may have, however, a cross-sectional dimensional area sized to enclose only a single spent nuclear fuel assembly 150.

In some aspects, the spent nuclear fuel assembly 150 may be stored in one or more other storage locations between steps 402 and 404. For example, the spent nuclear fuel assembly 150 may be moved from the nuclear reactor to a cooling pool (e.g., a spent fuel pool). The spent nuclear fuel assembly 150 may then be moved from the spent fuel pool to a dry cask canister for further storage. However, neither the spent fuel pool nor dry cask canister are designed for long term storage of the spent nuclear fuel assembly 150 (e.g., greater than 40-50 years).

The spent nuclear fuel assembly 150 may then be moved from the dry cask canister to the hazardous material canister 100 for long term storage, e.g., in a hazardous material storage repository 200. Preferably (e.g., due to safety and cost concerns), the spent nuclear fuel assembly 150 is not modified between steps 402 and 404. In other words, the spent nuclear fuel assembly 150 is removed from the nuclear reactor in a particular configuration (as shown in FIG. 1B) and is moved to the spent fuel pool, and then dry cask, and then canister 100 in the same (or substantially the same) configuration.

In some aspects, one or more intermediate storage steps (e.g., between the nuclear reactor and long term storage in a hazardous material storage repository as described in this application) may be skipped due to, for instance, the design of the hazardous material canister 100. For example, in some aspects, a spent nuclear fuel assembly 150 may be placed into a hazardous material canister 100 once a time period for storage of the assembly 150 in a spent nuclear fuel pool is complete. In some instances, the spent nuclear fuel assembly 150 may be placed into the hazardous material canister 100 within the pool. Next, the canister 100 (enclosing the spent nuclear fuel assembly 150) may be transported (e.g., within a transportation cask) to a well site (the hazardous material storage repository system 200). During transportation, the shielded material of the top and bottom portions of the canister 100 may protect or help protect those handling the canister from hazardous material, as well as radioactive gamma and x-rays. The transportation cask, which surrounds the unshielded middle portion of the canister 100, may provide gamma and x-ray shielding. Further, due to the shielded material of the top portion of the canister 100, the transportation cask may have an open top for ease of insertion and removal of the canister 100 therein.

Method 400 may continue at step 406, which includes enclosing the spent nuclear fuel assembly in the interior volume of the spent nuclear fuel canister. For example, the top portion 106 of the hazardous material canister 100 may be attached (e.g., welded or otherwise) to the middle portion 102 to physically seal the spent nuclear fuel assembly 150 into the volume 105 of the canister 100.

Method 400 may continue at step 408, which includes moving the spent nuclear fuel canister into an underground hazardous material storage repository. Step 408 may be performed, for example, as described with reference to FIGS. 2A-2C. Step 408 may also include, for example, transportation of the canister 100 (or canisters 100) from a nuclear reactor location to, e.g., a well site as part of hazardous material storage repository system 200.

Figure 5:
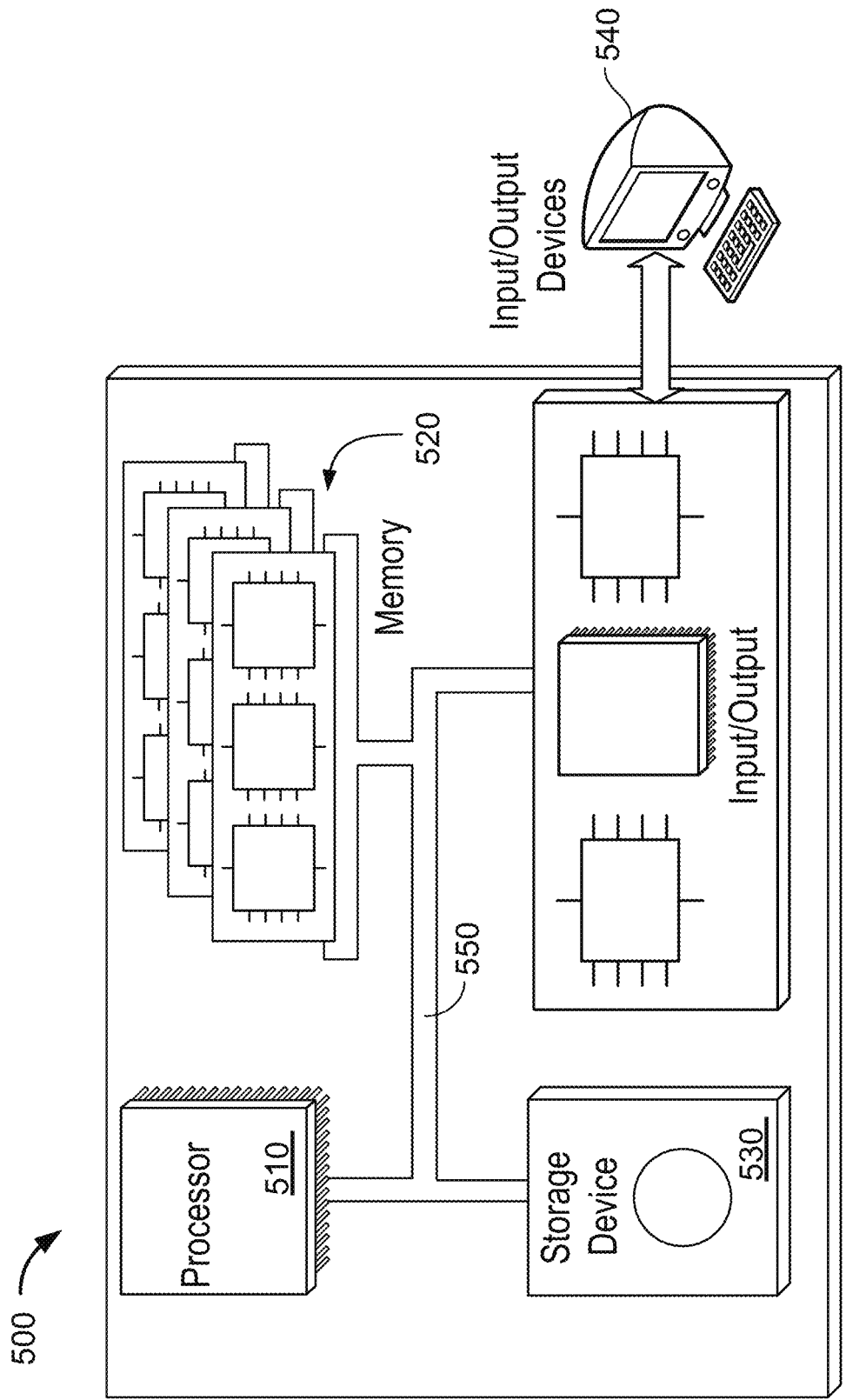
FIG. 5 is a schematic illustration of a controller or control system for monitoring a hazardous material storage repository system according to the present disclosure.

FIG. 5 is a schematic illustration of an example controller 500 (or control system) for a hazardous waste monitoring system. For example, the controller 500 can be used for the operations described previously, for example as or as part of the monitoring control system 246. For example, the controller 500 may be communicably coupled with, or as a part of, a hazardous material storage repository system as described herein.

The controller 500 is intended to include various forms of digital computers, such as printed circuit boards (PCB), processors, digital circuitry, or otherwise that is part of a vehicle. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The controller 500 includes a processor 510, a memory 520, a storage device 530, and an input/output device 540. Each of the components 510, 520, 530, and 540 are interconnected using a system bus 550. The processor 510 is capable of processing instructions for execution within the controller 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the controller 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the controller 500. In one implementation, the storage device 530 is a computer-readable medium. In various different implementations, the storage device 530 may be a floppy disk device, a hard disk device, an optical disk device, a tape device, flash memory, a solid state device (SSD), or a combination thereof.

The input/output device 540 provides input/output operations for the controller 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, solid state drives (SSDs), and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) or LED (light-emitting diode) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

What is claimed is:

1. A canister to store spent nuclear fuel in an underground repository, comprising:
a first end portion;
a second end portion; and
a middle portion comprising a first material that allows transmission of gamma rays through the middle portion, the middle portion attachable to the first and second end portions to define an interior volume of the housing that is sized to enclose at least one spent nuclear fuel assembly,
wherein the first and second end portions comprise shielding formed of a second material different than the first material, the second material having a thickness sufficient to form a barrier to gamma ray transmission through the first and second end portions, and
wherein the first material comprises a nickel-chromium alloy, and the second material comprises at least one of lead, tungsten, or concrete.

2. The canister of claim 1, wherein a thickness of the first material is sufficient to form a barrier to radioactive liquid, solid, and gas transmission through the middle portion.

3. The canister of claim 2, wherein the radioactive gas comprises tritium gas.

4. The canister of claim 1, wherein the middle portion comprises a circular cross-section.

5. The canister of claim 1, wherein the second end portion comprises a bottom member of the canister.

6. The canister of claim 5, wherein the bottom member is mechanically attached to the middle portion.

7. The canister of claim 1, wherein the shielding comprises a barrier to radioactive liquid and gas transmission through the first and second end portions.

8. The canister of claim 1, wherein the interior volume comprises a height dimension of between about 12 feet and about 15 feet and a cross-sectional diameter of between 7 inches and 13 inches.

9. The canister of claim 1, wherein the interior volume is sized to enclose a single spent nuclear fuel assembly.

10. The canister of claim 1, further comprising one or more rollers or bearings mounted to the middle portion.

11. The canister of claim 1, further comprising an electrically non-conductive material attached to the middle portion.

12. The canister of claim 11, wherein the non-conductive material comprises a plurality of quartz members attached to an exterior surface of the middle portion.

13. The canister of claim 11, further comprising a non-conductive covering that encloses at least a portion of the non-conductive material.

14. The canister of claim 1, wherein the second material comprises concrete, and the thickness of the second material is between 3 and 5 feet.

15. The canister of claim 1, wherein the second material comprises lead or tungsten, and the thickness of the second material is between 2 and 4 inches.

16. A canister to store spent nuclear fuel in an underground repository, comprising:
a first end portion;
a second end portion; and
a middle portion comprising a first material that allows transmission of gamma rays through the middle portion, the middle portion attachable to the first and second end portions to define an interior volume of the housing that is sized to enclose at least one spent nuclear fuel assembly,
wherein the first and second end portions comprise shielding formed of a second material different than the first material, the second material having a thickness sufficient to form a barrier to gamma ray transmission through the first and second end portions, and
wherein the second material comprises lead or tungsten, and the thickness of the second material is between 2 and 4 inches.

17. The canister of claim 16, wherein a thickness of the first material is sufficient to form a barrier to radioactive liquid, solid, and gas transmission through the middle portion.

18. The canister of claim 17, wherein the radioactive gas comprises tritium gas.

19. The canister of claim 16, wherein the middle portion comprises a circular cross-section.

20. The canister of claim 16, wherein the second end portion comprises a bottom member of the canister.

21. The canister of claim 20, wherein the bottom member is mechanically attached to the middle portion.

22. The canister of claim 16, wherein the shielding comprises a barrier to radioactive liquid and gas transmission through the first and second end portions.

23. The canister of claim 16, wherein the interior volume comprises a height dimension of between about 12 feet and about 15 feet and a cross-sectional diameter of between 7 inches and 13 inches.

24. The canister of claim 16, wherein the interior volume is sized to enclose a single spent nuclear fuel assembly.

25. The canister of claim 16, further comprising one or more rollers or bearings mounted to the middle portion.

26. The canister of claim 16, further comprising an electrically non-conductive material attached to the middle portion.

27. The canister of claim 26, wherein the non-conductive material comprises a plurality of quartz members attached to an exterior surface of the middle portion.

28. The canister of claim 26, further comprising a non-conductive covering that encloses at least a portion of the non-conductive material.

29. The canister of claim 16, wherein the first material comprises a nickel-chromium alloy and the second material comprises tungsten.

30. The canister of claim 16, wherein the first material comprises a nickel-chromium alloy and the second material comprises lead.

31. The canister of claim 16, wherein the first material comprises at least one of a nickel-chromium alloy or a carbon steel.

* * * * *